United States Patent [19]
Okamoto et al.

[11] Patent Number: 5,877,829
[45] Date of Patent: Mar. 2, 1999

[54] LIQUID CRYSTAL DISPLAY APPARATUS HAVING ADJUSTABLE VIEWING ANGLE CHARACTERISTICS

[75] Inventors: Masayuki Okamoto, Taki-gun; Nobuaki Yamada, Higashiosaka; Shuichi Kozaki, Nara; Yoshito Hashimoto, Osaka; Shigeaki Mizushima, Ikoma, all of Japan

[73] Assignee: Sharp Kabushiki Kaisha, Osaka, Japan

[21] Appl. No.: 746,579

[22] Filed: Nov. 14, 1996

[30] Foreign Application Priority Data

| Nov. 14, 1995 | [JP] | Japan | 7-295809 |
| Mar. 4, 1996 | [JP] | Japan | 8-046507 |
| Sep. 24, 1996 | [JP] | Japan | 8-251973 |

[51] Int. Cl.$^6$ .................. G02F 1/1347; G02F 1/1333; G02F 1/1335
[52] U.S. Cl. .................. 349/74; 349/110; 349/112; 349/64; 349/86
[58] Field of Search .................. 349/61, 64, 86, 349/110, 112, 62, 74, 129

[56] References Cited

U.S. PATENT DOCUMENTS

| Re. 33,987 | 7/1992 | Suzawa | 349/67 |
| 4,621,898 | 11/1986 | Cohen | 350/276 |
| 4,693,560 | 9/1987 | Wiley | 349/86 |
| 4,909,606 | 3/1990 | Wada et al. | 349/86 |
| 4,984,872 | 1/1991 | Vick | 349/62 |
| 5,331,446 | 7/1994 | Hirai et al. | 349/61 |
| 5,462,700 | 10/1995 | Beeson et al. | 264/1.27 |
| 5,473,450 | 12/1995 | Yamada et al. | 359/51 |
| 5,486,936 | 1/1996 | Fujikake et al. | 349/86 |
| 5,526,146 | 6/1996 | Goodman et al. | 349/61 |
| 5,570,210 | 10/1996 | Yoshida et al. | 349/86 |
| 5,579,140 | 11/1996 | Yamahara et al. | 359/75 |
| 5,617,251 | 4/1997 | Ohta et al. | 349/61 |
| 5,644,369 | 7/1997 | Jachimowicz et al. | 349/112 |

FOREIGN PATENT DOCUMENTS

| 57-186735 | 11/1982 | Japan . |
| 61-502128 | 9/1986 | Japan . |
| 4-212928 | 8/1992 | Japan . |
| 4-338923 | 11/1992 | Japan . |
| 5-27242 | 2/1993 | Japan . |
| 5-72529 | 3/1993 | Japan . |
| 6-194655 | 7/1994 | Japan . |
| 6-301015 | 10/1994 | Japan . |
| 6-308496 | 11/1994 | Japan . |
| 6-324337 | 11/1994 | Japan . |
| 7-120728 | 5/1995 | Japan . |
| 7-333640 | 12/1995 | Japan . |
| WO 85/04262 | 9/1985 | WIPO . |

OTHER PUBLICATIONS

S. Zimmerman, et al., SID 95 Digest, pp. 793–796, 1995, "36.2: Viewing–Angle–Enhancement System for LCDs".

Primary Examiner—William L. Sikes
Assistant Examiner—Tarifur R. Chowdhury
Attorney, Agent, or Firm—David G. Conlin; George W. Neuner

[57] ABSTRACT

A liquid crystal display apparatus includes: a liquid crystal display device; an illumination device for irradiating the liquid crystal display device with collimated light; and a control device for electrically controlling a direction of travel of light going out from or entering the liquid crystal display device, thereby having adjustable viewing angle characteristics.

18 Claims, 22 Drawing Sheets

PRIOR ART (Broad viewing angle characteristics)

(Narrow viewing angle characteristics)

States of second optical element 13 
- ⊗ Transparent
- × Gray scale tone
- △ Scattering/Diffusing (Broad viewing angle characteristics)

(Narrow viewing angle characteristics)

(Voltage applied : transparent)

(No voltage applied : scattering)

Transparent substrate — Absorber

Area where CR>10 and transmitted light is observable

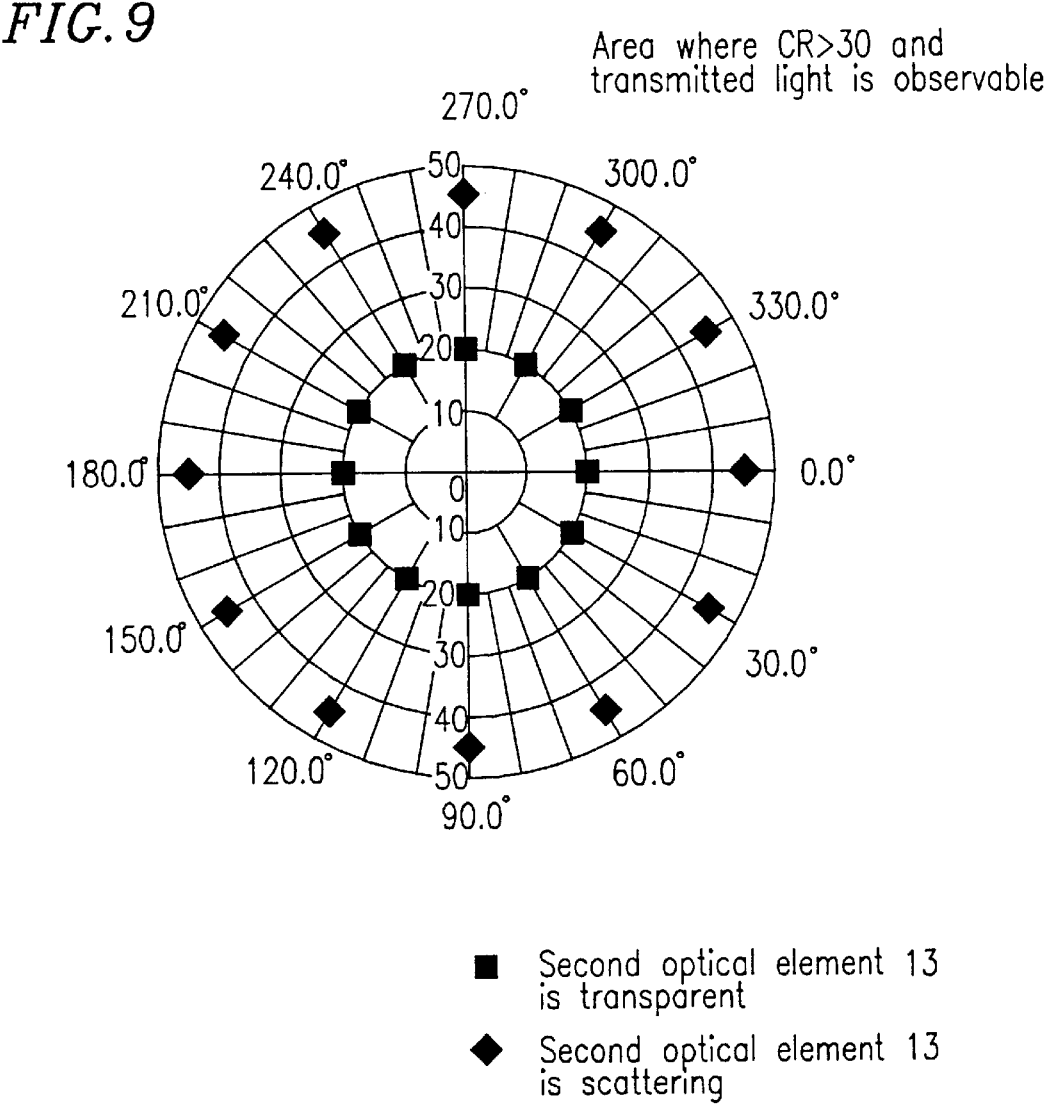

Area where CR>30 and transmitted light is observable

■ Second optical element 13 is transparent

◆ Second optical element 13 is scattering

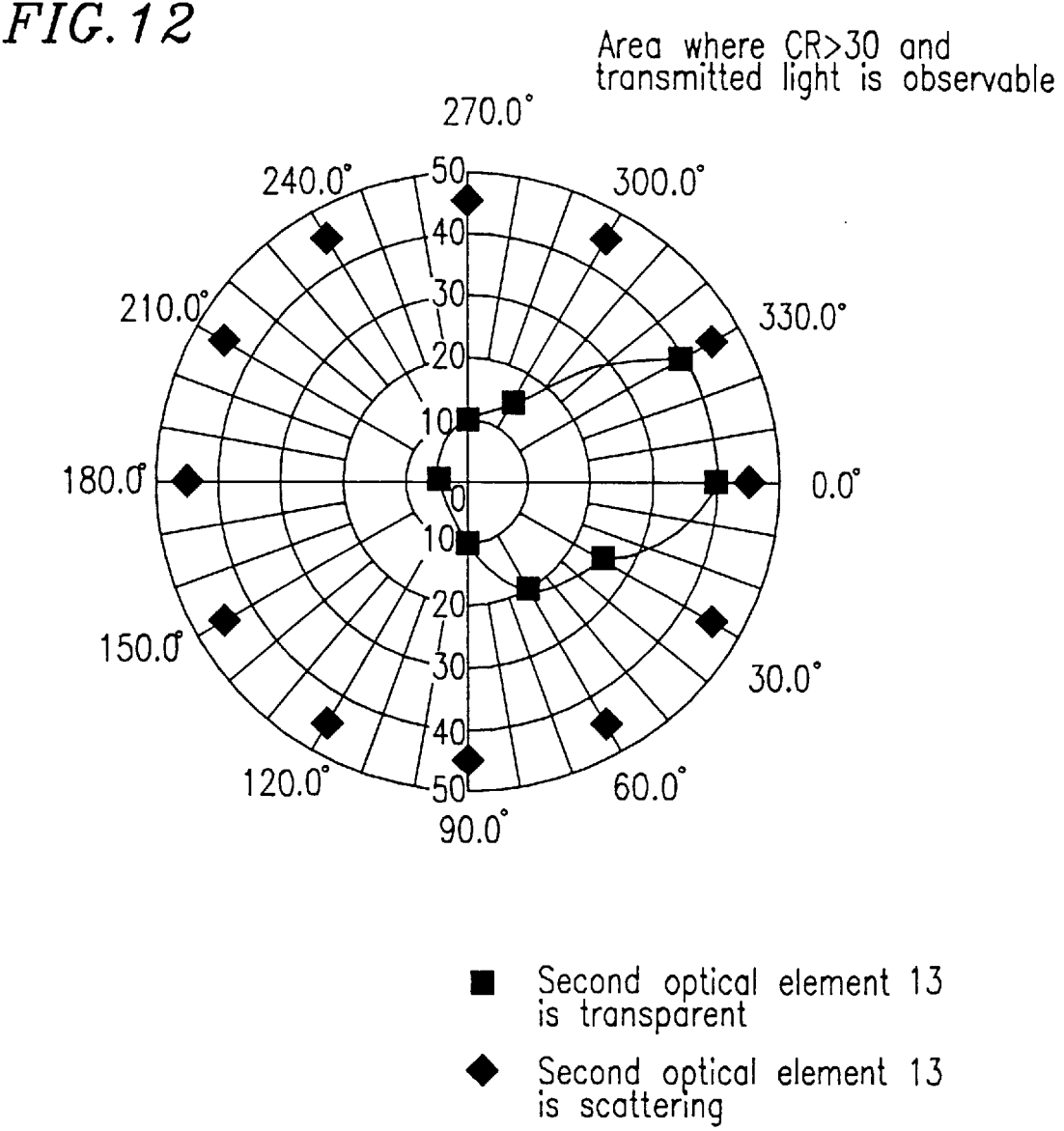
FIG.12 Area where CR>30 and transmitted light is observable
■ Second optical element 13 is transparent
♦ Second optical element 13 is scattering (Broad viewing angle characteristics)

(Narrow viewing angle characteristics)

Second optical element 13 scattering (OFF)

Second optical element 13 being transparent (ON)

Area where CR>10 and transmitted light is observable

Second optical element 13 scattering (OFF)

Second optical element 13 being transparent (ON)

Area where CR>10 and transmitted light is observable

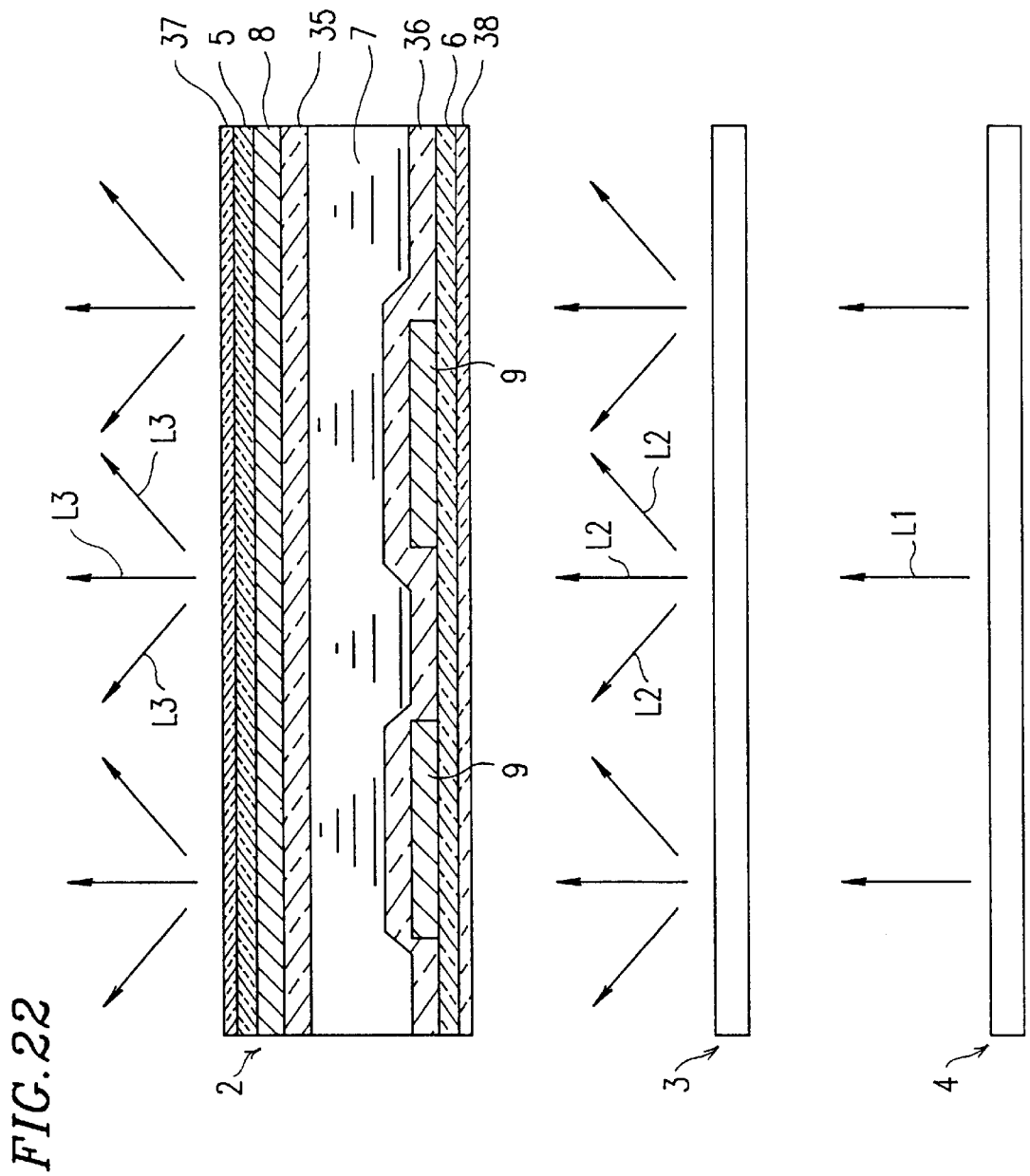

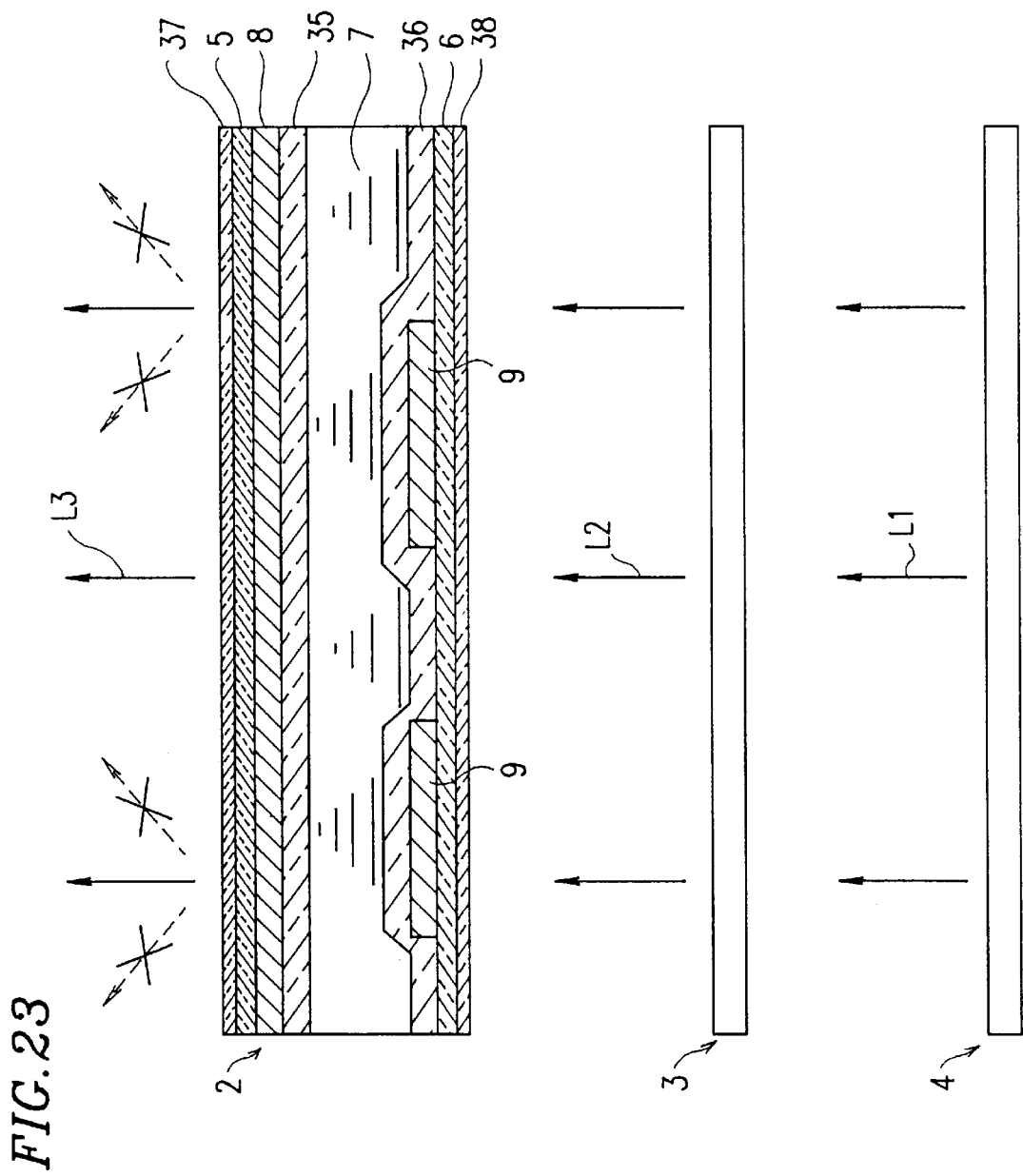

LIQUID CRYSTAL DISPLAY APPARATUS HAVING ADJUSTABLE VIEWING ANGLE CHARACTERISTICS

BACKGROUND OF THE INVENTION

1. Field of the Invention:

The present invention relates to a liquid crystal (LC) display apparatus. More particularly, the present invention relates to an LC display apparatus incorporating an LC display device with controllable viewing angle characteristics. The present invention also relates to an LC display apparatus in which highly-collimated light is emitted toward an LC display device thereof.

2. Description of the Related Art:

LC display apparatuses are widely employed as digit segment type display devices for clocks and calculators and as display devices for displaying general images. A number of types of LC display devices to be incorporated in LC display apparatuses are known. For example, one type of LC display device includes active elements, e.g., TFTs (thin film transistors), provided on a light-transmitting substrate, the active elements functioning as switching means for selecting pixel electrodes for applying a voltage to liquid crystal. Another type of LC display device is characterized by including color filter layers of red, green, blue, or the like are provided as color display means.

Since LC display devices consume relatively little power, they are often employed as display devices for mobile or portable appliances, e.g., laptop-type personal computers and word processors. An LC display device can adopt any one of various display modes. Examples of display modes which utilize electrooptical effects include a TN (twisted nematic) mode, an STN (super twisted nematic) mode, an ECB (electrically controlled birefringence) mode, and an OCB (optically compensated birefringence) mode.

An active driving type TN liquid crystal display mode includes liquid crystal molecules twisted at a twist angle of 90°. A multiplex driving type STN liquid crystal display mode includes liquid crystal molecules which are twisted at a twist angle of 90° or more so as to utilize the steepness transmittance/voltage (applied to the liquid crystal) characteristics.

TN type LC display devices and STN type LC display devices are known to have display characteristics problems that are inherent within their display principles. Specifically, in an LC display device of either a TN or STN mode, the angle or direction in which liquid crystal molecules can be observed when a voltage is applied is uniquely determined by the ideal viewing angle prescribed for each device. Thus, as the viewing angle is tilted with respect to the orthogonal direction (which defines the ideal viewing angle), the light transmittance varies accordingly. This phenomenon is especially marked in gray scale tones. Therefore, the acceptable range of viewing angles is considerably limited in the case of the TN and STN modes.

Conventional techniques for improving the viewing angle characteristics of such LC display devices have been proposed. One technique alters the orientation state of liquid crystal in the cell. Another technique broadens the extent of the light on the viewer's side (as controlled by an illumination system) by utilizing the frontal (orthogonal) characteristics of a TN type LC display device. There has also been proposed a polymer dispersed type LC display device, which performs a display function by controlling the transmitted light based on light scattering control. This method provides relatively broad viewing angle characteristics in the case of a scatter type LC display device because the contrast of the display screen does not depend on the relationship between the orientation direction of the liquid crystal molecules and the direction of observation.

First, the conventional technique for improving viewing angle characteristics by altering the orientation state of the liquid crystal molecules in the cell is described. In order to improve the viewing angle characteristics of an LC display device incorporating polarizing plates by this method, it is necessary to ensure that the liquid crystal molecules are oriented in at least two different directions within each pixel.

FIG. 1A schematically shows liquid crystal molecules being oriented in two directions within a region of a LC layer that corresponds to each pixel. While displaying a gray scale tone in this orientation state, the transmittance (refractive index) when the LC layer is viewed in direction $1a$ and that when the LC layer is viewed in direction $1b$ are averaged to become substantially equal. As a result, the viewing angle characteristics are improved as compared with the characteristics of the conventional TN mode illustrated in FIG. 1B. In FIG. 1B, the liquid crystal molecules are tilted in the same direction when displaying a gray scale tone, so that the apparent refractive index differs depending on whether the LC display device is viewed in direction $1a$ or direction $1b$. This results in a large difference in contrast depending on whether the LC display device is viewed in direction $1a$ or direction $1b$. Consequently, display problems such as an inversion of white/black or hue may occur.

Specific examples of attempts to obtain broad viewing angle characteristics include the following.

First, examples of attempts to improve the viewing angle characteristics based on the structure inside the LC display device (LC layer) are described in the following paragraphs (numbered (1)–(6)):

(1) A method has been proposed for electrically controlling the transparent state and the white state of liquid crystal by utilizing the birefringence of the liquid crystal. An LC layer includes a liquid crystal region and a support medium (polymer wall). The LC display device does not require any polarizing plates or alignment treatments. In principle, this method ensures that the ordinary light refractive index of the liquid crystal molecules coincides with the refractive index of the support medium so that a transparent state is displayed when a voltage is applied to align the liquid crystal molecules and a scattering state is displayed when no voltage is applied so as to allow the liquid crystal molecules to be randomly oriented (scattered type).

As an example of this method, Japanese laid open National Patent Publication No.61-502128, for example, discloses a method in which a liquid crystal and a photocurable or thermocurable resin are mixed together and the resin is thereafter cured by the application of light or heat so that liquid crystal regions are deposited, thereby forming liquid crystal droplets within the resin.

Furthermore, Japanese Laid-open Patent Publications Nos. 4-338923 and 4-212928 disclose techniques concerning a broad viewing angle mode LC display device which incorporates the above-mentioned LC display device along with polarizers.

(2) A method for improving the viewing angle characteristics of a non-scattering type LC display device using a polarizer is disclosed in Japanese Laid-open Patent Publication No. 5-27242. This method subjects a mixture of the liquid crystal and a photocurable resin to a phase separation to obtain a composite material of a liquid crystal and a polymer. According to this method, the orientation state of the liquid crystal molecules in each liquid crystal region becomes random due to the produced polymer disturbing the orientation of the liquid crystal molecules. Therefore, the liquid crystal molecules stand in different directions in each minute domain in each liquid crystal region including randomly-oriented liquid crystal molecules, so that the average value of the transmittance in that state becomes substantially identical regardless of the viewing direction. As a result, the viewing angle characteristics when displaying a gray scale tone are improved.

(3) Recently, the inventors of the present invention have proposed a method for orienting liquid crystal molecules in an omnidirectional manner (e.g., in a spiral shape) within each pixel region by controlling the intensity of light irradiated for photopolymerizing a mixture including a liquid crystal and a photopolymerizable resin by means of a photomask or the like (Japanese Laid-Open Patent Publication No.7-120728). According to this method, the liquid crystal molecules are voltage-controlled so that the spiral orientation shifts to a homeotropic orientation without ruining its omnidirectionality. As a result, the angle dependence of display is alleviated, whereby the viewing angle characteristics of the LC display device are remarkably improved.

(4) The inventors of the present invention have also proposed an LC display device in Japanese Laid-Open Patent Publication No.6-308496, which incorporates a crystalline polymer film having spherulites formed therein as an alignment film. As a result, the liquid crystal molecules are axially symmetrically oriented so as to realize a broad viewing angle characteristics mode. As used herein, a spherulite is defined as a spherical polycrystal in which a number of minute crystals (crystallets) are radially aligned with respect to a center.

(5) Japanese Laid-Open Patent Publication No.6-194655 discloses a method for randomly orienting liquid crystal molecules by applying an alignment film on a substrate without performing any alignment treatments (e.g., rubbing) for the alignment film.

(6) Japanese Laid-Open Patent Publication No.57-186735 discloses a method for aligning the liquid crystal molecules in a plurality of regions into which each pixel is divided so that the orientation states of the respective divided regions compensate for one another to realize broad viewing characteristics.

Furthermore, Japanese Laid-Open Patent Publication No.5-72529 discloses an LC display device utilizing the optical rotatory power and birefringence of a TN liquid crystal or the like which includes an LC layer for controlling the light scattering, as well as an apparatus and a system incorporating the LC display device. The luminance, hue, and contrast ratio of the LC display device are disclosed as having a small viewing angle dependence. This LC display device attains viewing angle characteristics similar to the viewing angle characteristics of the conventional TN liquid crystal when a voltage is applied to the additional LC layer so as to attenuate light scattering (i.e., a light transmitting state), and hence the LC display apparatus becomes difficult to be seen by anyone other than the user thereof.

Next, an example of an attempt to improve the viewing characteristics by controlling light in an illumination system and on the viewer's side, rather than based on the structure inside the LC display device (LC layer) is described.

SID 95 DIGEST, 36.2 (p.793–796) reports a method for collimating light which enters an LC display device and further broadening the extent of light coming out through the front face of the LC display device on the viewer's side. According to this method, light entering the LC cell is substantially collimated by using an optical filter for controlling the direction of the travel of light (e.g., a directional optical filter disclosed in U.S. Pat. No. 4,621,898) or the like. Furthermore, a sheet capable of diffusing light is provided on the viewer's side (i.e., the side through which the light comes out of the LC cell) of the display device. According to this method, the incident light substantially vertically travels through the LC display device (e.g., the TN mode or the STN mode), so that a high contrast is obtained and the color shift is prevented. Furthermore, by adding a diffusion sheet on the side of the LC cell opposite the light source, the frontal characteristics of the LC display device can be appreciated over a broad range of viewing angles.

The above-mentioned appliances (e.g., personal computers and word processors) incorporating LC display devices are beginning to be used for various purposes and in various situations. For example, in the case where a presentation meeting is held by using such appliances, it is desirable that the display device have broad viewing angle characteristics because a number of people will simultaneously watch the display device. On the other hand, in the case where such appliances are used for inputting and displaying information in public places or in public transportation means, e.g., airplanes or trains, it is desirable that the viewing angle characteristics be just broad enough for the user to be comfortable so that others cannot peek at the display screen, out of privacy and confidentiality concerns. Such different needs have required a single apparatus that includes a display device having controllable viewing angle characteristics so that the display device can be adapted from a broad viewing angle mode (for a number of simultaneous users) to a narrow viewing angle mode (for one user only).

However, the above-mentioned conventional LC display devices, which attempt to broaden the viewing angle characteristics, cannot adapt the viewing angle characteristics to different needs, especially in an electrical manner.

Moreover, the LC display apparatus disclosed in Japanese Laid-Open Patent Publication No.5-72529 has the following problem. The directionality of backlight provided in a conventional display apparatus is such that the light expands in directions other than the LC display device itself so that it can be observed by people who are not orthogonally situated with respect to the display screen thereof. That is, in accordance with a conventional structure where lowly-collimated light is emitted toward the LC display device, the viewing angle characteristics of the LC display apparatus cannot be made sufficiently narrow so that only a person who is situated orthogonally with respect to the display screen can observe the displayed image, even by placing the additional LC layer for controlling the light scattering in a light transmitting state in order to allow little light to be scattered. Therefore, in order to ensure that only a person who is situated orthogonally with respect to the display screen can observe the displayed image in the above-mentioned LC display apparatus, it is necessary to emit highly-collimated light toward the LC display device.

LC display apparatuses having other structures may similarly require highly-collimated light to be emitted toward the LC display devices.

SUMMARY OF THE INVENTION

A liquid crystal display apparatus according to the present invention includes: a liquid crystal display device; an illumination device for irradiating the liquid crystal display device with collimated light; and a control device for electrically controlling a direction of travel of light going out from or entering the liquid crystal display device, thereby having adjustable viewing angle characteristics.

In one embodiment of the invention, the collimated light is light which is collimated substantially perpendicularly with respect to the liquid crystal display device.

In another embodiment of the invention, the collimated light is light which is collimated along an optimum contrast direction for the liquid crystal display device.

In still another embodiment of the invention, the control device for electrically controlling the direction of travel of the light is provided on a display screen side of the liquid crystal display device, the control device thereby controlling the light going out from the liquid crystal display device.

In still another embodiment of the invention, the control device for electrically controlling the direction of travel of the light is provided between the liquid crystal display device and the illumination device, the control device thereby controlling the light entering the liquid crystal display device.

Alternatively, a liquid crystal display apparatus according to the present invention includes: a liquid crystal display device; an illumination device having a directionality substantially perpendicular with respect to a display screen of the liquid crystal display device; and a control device for electrically controlling a direction of travel of light, the control device being provided on a side of the liquid crystal display device opposite from the illumination device.

Alternatively, a liquid crystal display apparatus according to the present invention includes: a liquid crystal display device; an illumination device having a directionality substantially perpendicular with respect to a display screen of the liquid crystal display device; and a control device for electrically controlling a direction of travel of light, the control device being provided between the liquid crystal display device and the illumination device.

In one embodiment of the invention, the control device for controlling the direction of travel of the light is an element having an electrically controllable scattering state and an electrically controllable transparent state.

In another embodiment of the invention, the liquid crystal display device performs display in a TN mode, an STN mode, an ECB mode, or an OCB mode.

In still another embodiment of the invention, the control device for controlling the direction of travel of the light is a polymer dispersed type liquid crystal display device.

In still another embodiment of the invention, the liquid crystal display device includes a liquid crystal layer sealed between a pair of substrates, the liquid crystal layer including liquid crystal molecules, and the liquid crystal display device having a plurality of pixels, and the liquid crystal molecules in the liquid crystal layer are oriented in two or more directions in a region corresponding to each pixel on at least one of the pair of substrates.

In still another embodiment of the invention, the liquid crystal display device includes a liquid crystal layer sealed between a pair of substrates, the liquid crystal layer including liquid crystal molecules, and the liquid crystal layer having a plurality of liquid crystal regions each substantially surrounded by a polymer wall, and the liquid crystal molecules in each liquid crystal region are oriented in two or more directions on at least one of the pair of substrates.

In still another embodiment of the invention, an alignment layer is provided on at least one of the pair of substrates, the alignment layer causing the liquid crystal molecules in the liquid crystal layer to be oriented in at least two directions.

In still another embodiment of the invention, the alignment layer is a crystalline polymer film having a spherular structure.

In still another embodiment of the invention, the alignment layer is in a non-oriented state, the liquid crystal molecules in the liquid crystal layer being randomly oriented.

In still another embodiment of the invention, the liquid crystal molecules have an axially symmetrical orientation state.

Alternatively, a liquid crystal display apparatus according to the present invention includes a liquid crystal display device and an irradiation section for irradiating the liquid crystal display device from behind; and a transmissive sheet disposed in an optical path between the irradiation section and the liquid crystal display device, with a plurality of light-shielding members being provided on the transmissive sheet so as to be parallel to one another.

In one embodiment of the invention, a plurality of grooves having roughly V-shaped cross sections are provided so as to be parallel to one another on a side of the transmissive sheet facing the liquid crystal display device and the light-shielding members are provided along the plurality of grooves, thereby causing light from the irradiation section to be gathered onto the liquid crystal display device.

In another embodiment of the invention, a scattering control element is provided on a side of the liquid crystal display device facing the transmissive sheet or on the opposite side thereof, the scattering control element including a liquid crystal at least capable of controlling scattering of light and a driving means for driving the liquid crystal.

Thus, the invention described herein makes possible the advantages of (1) providing an LC display apparatus capable of electrically controlling the viewing angle characteristics thereof outside an LC display device (i.e., LC cell) thereof; and (2) providing an LC display apparatus in which highly-collimated light is emitted toward an LC display device thereof.

These and other advantages of the present invention will become apparent to those skilled in the art upon reading and understanding the following detailed description with reference to the accompanying figures.

BRIEF DESCRIPTION OF THE DRAWINGS

FIG. 9 is a diagram illustrating exemplary viewing angle characteristics of an LC display apparatus according to an example of the present invention.

FIG. 12 is a graph illustrating exemplary viewing angle characteristics of an LC display apparatus according to an example of the present invention.

FIG. 22 is a diagram illustrating the viewing angle characteristics when the scattering control element shown in FIG. 19 is in a scattering state.

FIG. 23 is a diagram illustrating the viewing angle characteristics when the scattering control element shown in FIG. 19 is in a transparent state.

DESCRIPTION OF THE PREFERRED EMBODIMENTS

Hereinafter, embodiments of the present invention will be described with reference to the accompanying figures.

Figure 1A:
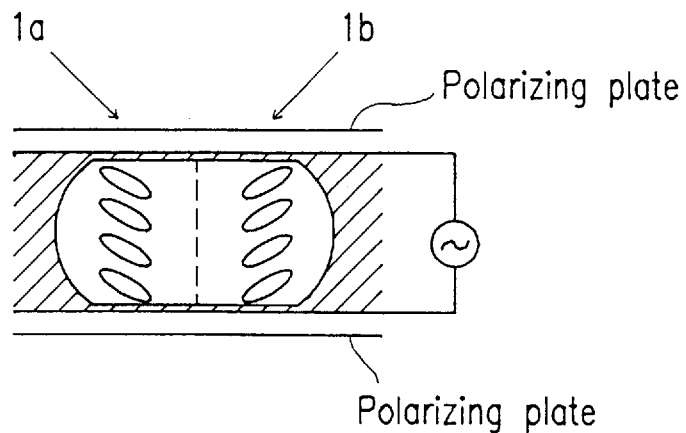
FIG. 1A is a prior art cross-sectional diagram illustrating the principle of improvement in the viewing angle characteristics of an LC display device of a broad-viewing angle mode using polarizing plates.
Figure 1B:
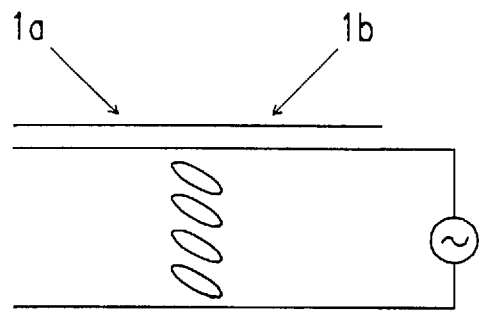
FIG. 1B is a prior art cross-sectional diagram illustrating the change in the apparent refractive index depending on the viewing angle of a conventional TN mode LC display device.
Figure 2A:
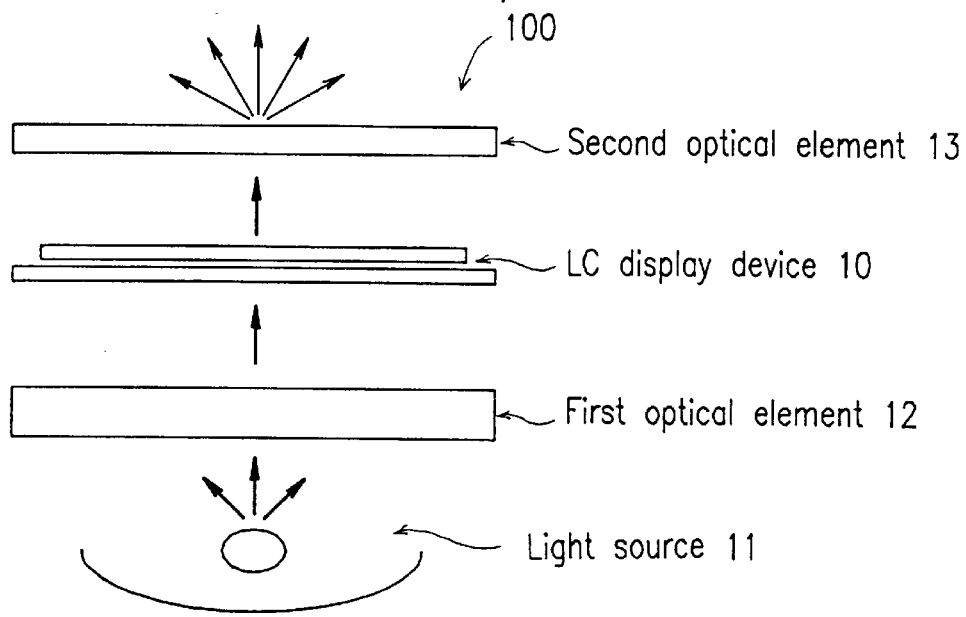
FIG. 2A is a view showing a first embodiment of the LC display device according to the present invention.
Figure 2B:
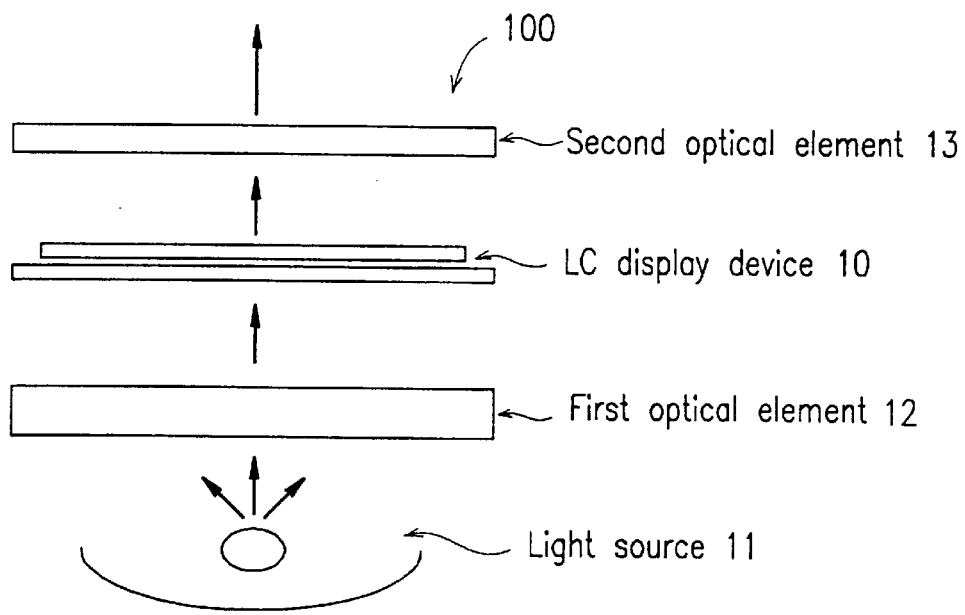
FIG. 2B is a view showing a first embodiment of the LC display device according to the present invention.

FIGS. 2A and 2B show an LC display apparatus 100 according to a first embodiment of the present invention. As shown in FIGS. 2A and 2B, the LC display apparatus 100 includes an LC display device 10, a light source 11, a first optical element 12 for substantially collimating light emitted from the light source 11, and a second optical element 13 for electrically controlling the diffusion/passing of the light from the LC display device 10.

The first optical element 12 functions to substantially restrict the direction of emission of the light entering the first optical element 12 to the direction of the normal axis of the first optical element 12. Therefore, by disposing the first optical element 12 between the light source 11 and the LC display device 10 so as to be parallel to the LC display device 10, the LC display device 10 is illuminated substantially by light travelling along the normal axis of the LC display device 10.

The directionality of the emission from the first optical element 12 determines the directionality of the light going out of the LC display device 10, which is illuminated by the light traveling through the first optical element 12. Specifically, if the LC display device 10 being illuminated by light having a high (i.e., narrow) directionality is observed from any direction other than the direction in which the outgoing light has the highest intensity, substantially no light reaches the observer, so that the LC display device 10 seems black as if the backlight was not activated. By using such a first optical element 12 having directionality, it becomes impossible to observe the display content from directions other than the intended direction, regardless of the narrow or broad viewing angle characteristics of the LC display device 10. As a result, a narrow viewing angle mode can be realized.

When the second optical element 13 is in a transparent state, as shown in FIG. 2B, light radiated through the LC display device 10 is observed as it is. As a result, any unintended viewing of the LC display device 10 that is made in directions wide away from the normal axis of the display surface of the LC display device 10 can be prevented. On the other hand, when the second optical element 13 is in a diffusion state, the light radiated through the LC display device 10 is observed to be diffused as shown in FIG. 2A. As a result, the viewing characteristics obtained along the normal axis of the LC display device 10 when the second optical element 13 is in a transparent state are also enjoyed in other directions as well. Thus, the LC display apparatus 100 provides broad viewing angle characteristics in this mode.

By thus electrically controlling the transparent state and the diffusion state of the second optical element 13, light going out of the LC display device 10 is controlled so as to directly pass through or be diffused. Accordingly, the viewing angle characteristics of the LC display apparatus 100 are broadened or narrowed.

Figure 3A:
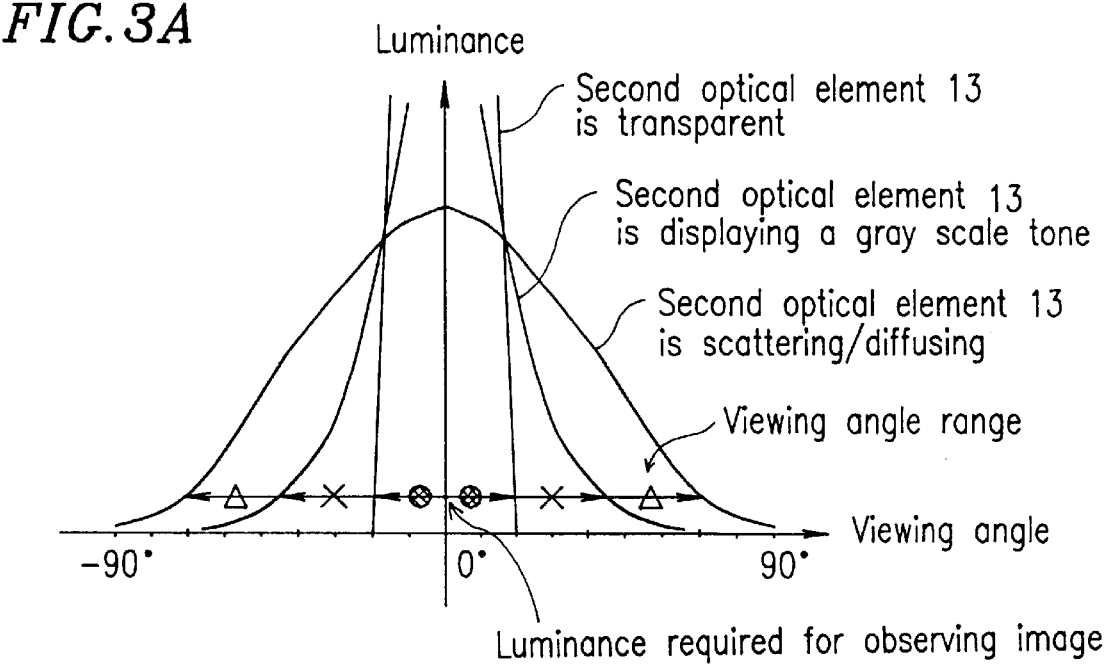
FIG. 3A is a graph showing the relationship between the luminance and the viewing angle, with respect to the transparent state, the gray scale tone state, or the scattering state of the second optical element.

It is also possible to control the transmission state of the second optical element 13 to present a gray scale tone between the transparent state and the diffusion state, thereby providing an intermediate viewing angle mode. FIG. 3A shows the relationship between the luminance and the viewing angle of the LC display apparatus 100, with respect to the transparent state (indicated as ●), the gray scale tone state (indicated as X), or the scattering state (indicated as Δ) of the second optical element 13. The vertical axis of FIG. 3A represents the brightness (luminance), whereas the horizontal axis represents the viewing angle.

Figure 3B:
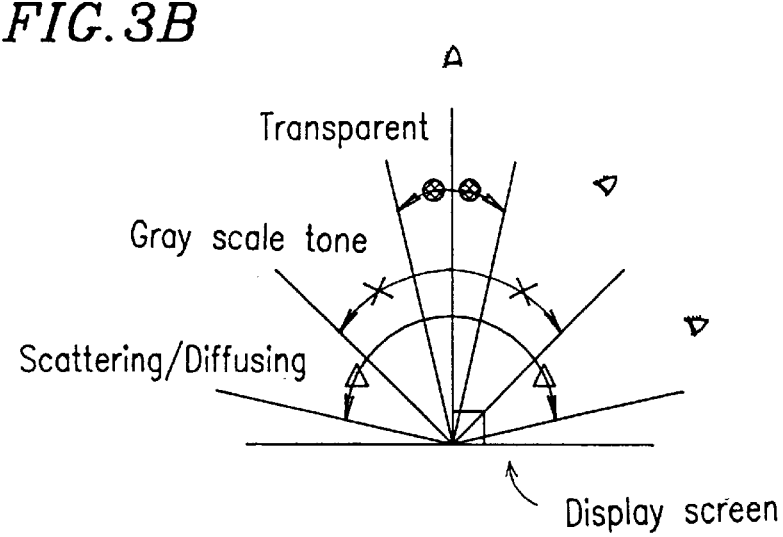
FIG. 3B is a diagram showing the range of viewing angles in which the displayed image can be observed with respect to the transparent state, the gray scale tone state, or the scattering state of the second optical element.

FIG. 3B is a diagram showing the range of viewing angles where adequate luminance for observing an image displayed by the LC display apparatus 100 is provided, with respect to the transparent state (indicated as ●), the gray scale tone state (indicated as X), or the scattering state (indicated as Δ) of the second optical element 13. As seen from FIG. 3B, the viewing angle characteristics of the LC display apparatus 100 can be adjusted by controlling the state of the second optical element 13 to be either the transparent state, the gray scale tone state, or the scattering state.

Figure 4A:
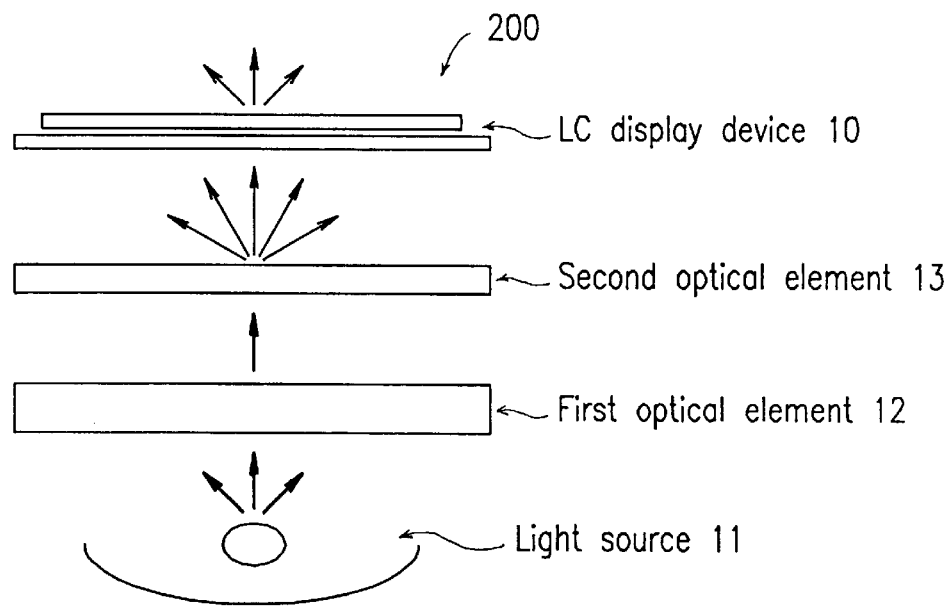
FIG. 4A is a view showing a second embodiment of the LC display device according to the present invention.
Figure 4B:
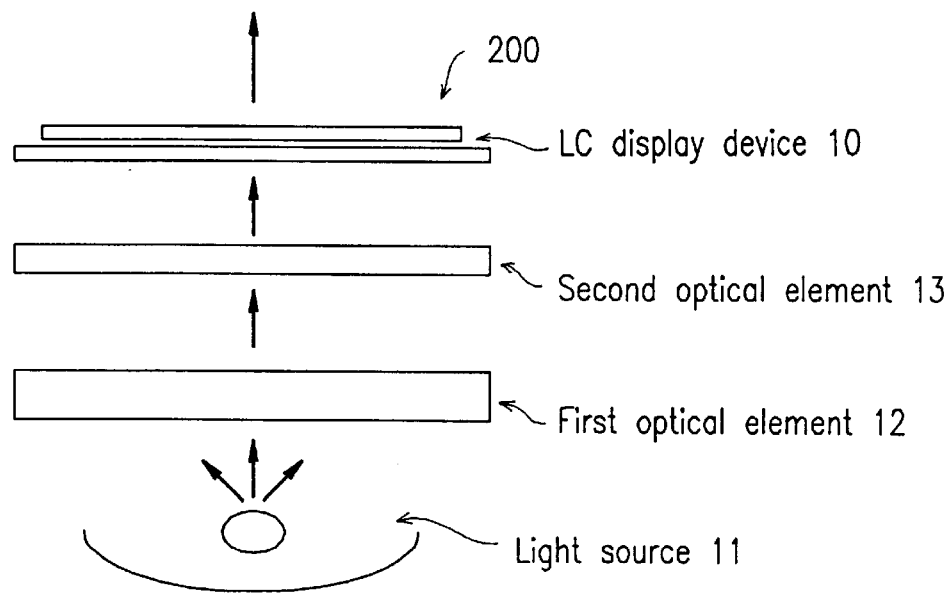
FIG. 4B is a view showing a second embodiment of the LC display device according to the present invention.

FIGS. 4A and 4B show an LC display apparatus 200 according to a second embodiment of the present invention. As shown in FIGS. 4A and 4B, the LC display apparatus 200 includes an LC display device 10, a light source 11, a first optical element 12 for substantially collimating light emitted from the light source 11, and a second optical element 13 for electrically controlling the diffusion/passing of the light from the light source 11.

The second embodiment (shown in FIGS. 4A and 4B) is different from the first embodiment shown in FIGS. 2A and 2B) in that the second optical element 13 is disposed between the LC display device 10 and the first optical element 12. The viewing angle characteristics of the LC display apparatus 200 can be electrically controlled in accordance with this arrangement. In this case, the light entering the LC display device 10 is controlled so as to directly pass through or be diffused. Therefore, the maximum range of the viewing angle of the LC display apparatus 200 are defined by the viewing angle characteristics of the LC display device 10.

Since the directionality of the first optical element 12 defines the directionality of the light emitted from the LC display apparatus 200 as in the first embodiment of the present invention, the range of viewing angles provided by this arrangement is limited to a range accommodating the position of the viewer situated in the direction of emission from the first optical element 12 so that only this viewer can observe the image displayed by the LC display apparatus 200.

By adopting a broad viewing angle mode for the display mode of the LC display device 10, the change between the broad viewing angle display and the narrow viewing angle display can be enhanced.

Although the collimated light enters the LC display apparatus substantially perpendicularly in the above-described embodiments, the specific direction of the incident collimated light can be adapted to the specific purposes or requirements. For example, in the case of the TN mode, the optimum contrast direction is at an angle of about 10° with respect to the normal axis direction. Therefore, by adapting the direction of the collimated light to such a direction, the visibility of the displayed image can be further enhanced.

Next, the first and second optical elements 12 and 13 are described in detail.

Figure 5A:
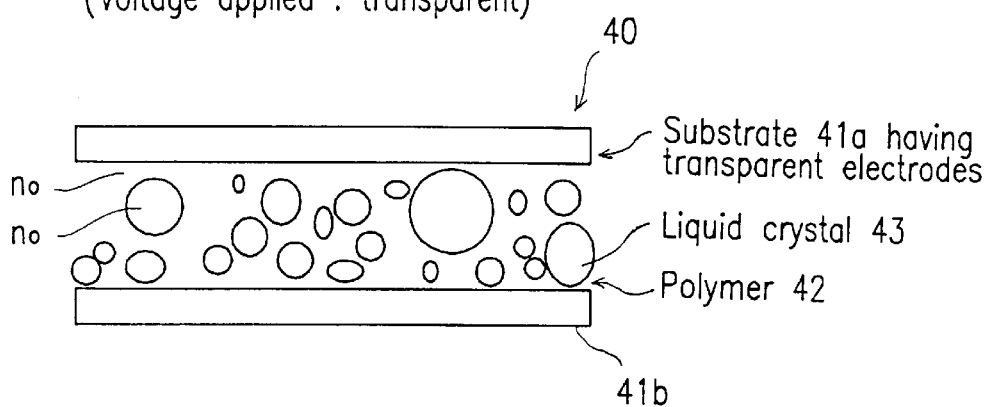
FIG. 5A is a cross-sectional diagram illustrating the operation of a PDLC (polymer dispersed liquid crystal) display.
Figure 5B:
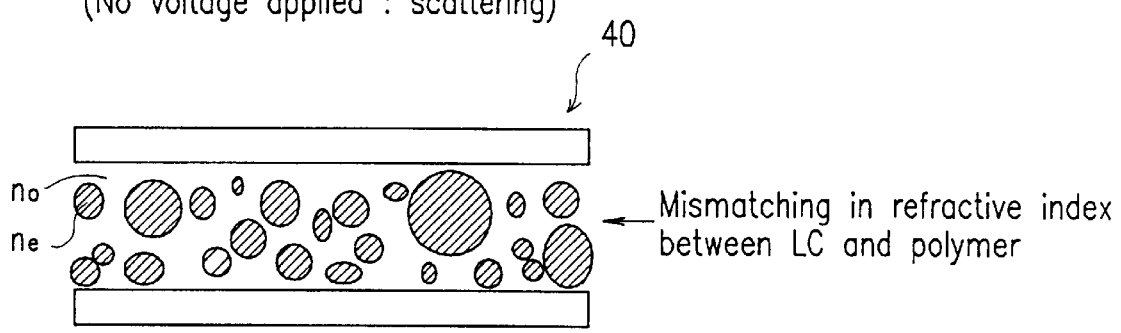
FIG. 5B is a cross-sectional diagram illustrating the operation of a PDLC (polymer dispersed liquid crystal) display.

(1) The second optical element 13 for electrically controlling light so as to directly pass through or be diffused As the second optical element 13 for electrically controlling light so as to directly pass through or be diffused, an element having an electrically controllable scattering state and an electrically controllable transparent state can be employed, for example. Specifically, a polymer dispersed liquid crystal device (PDLC) can be suitably used, in which a polymer is dispersed within a liquid crystal or LC regions are dispersed within a polymer functioning as a support medium. FIGS. 5A and 5B show a PDLC 40 including a LC layer interposed between a pair of transparent substrates 41a and 41b (having transparent electrodes provided thereon), in which liquid crystal regions 43 are dispersed within a polymer support medium 42. When a voltage is applied so that the refractive index ($n_o$) of the liquid crystal becomes equal to the refractive index of the polymer, the PDLC 40 becomes transparent, as shown in FIG. 5A. When no voltage is applied so that the refractive index ($n_e$) of the liquid crystal becomes unequal to the refractive index of the polymer, the PDLC 40 enters a scattering state, as shown in FIG. 5B.

The second optical element 13 in the present invention is not limited to the above-mentioned PDLC 40. Any element can be employed which exhibits a transparent state by equalizing the refractive index ($n_o$ or $n_e$) of the liquid crystal in the LC layer to the refractive index of the support medium or additive existing around the liquid crystal (e.g., polymer or inorganic material) and exhibits a scattering state by mismatching the refractive index of the liquid crystal with the support medium or additive existing around the liquid crystal, such controlled being made by the application of a voltage.

Figure 6A:
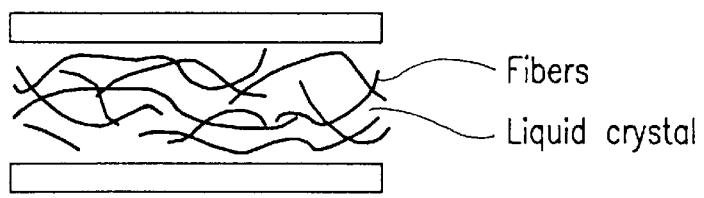
FIG. 6A is a cross-sectional diagram illustrating an exemplary configuration of a PDLC.
Figure 6B:
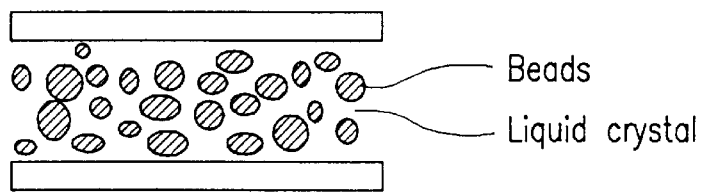
FIG. 6B is a cross-sectional diagram illustrating an exemplary configuration of a PDLC.
Figure 6C:
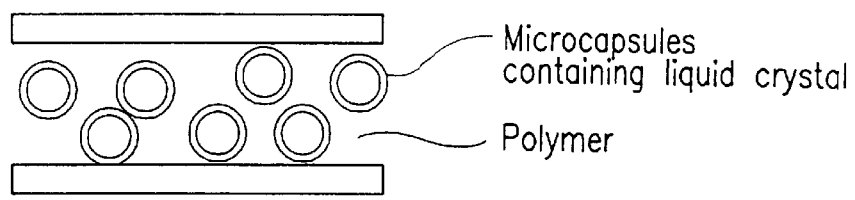
FIG. 6C is a cross-sectional diagram illustrating an exemplary configuration of a PDLC.
Figure 6D:
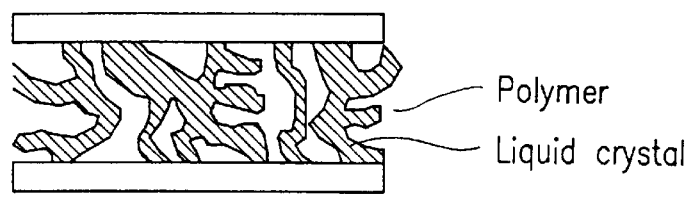
FIG. 6D is a cross-sectional diagram illustrating an exemplary configuration of a PDLC.

For example, an element including an LC layer in which polymer fibers are added to a liquid crystal (shown in FIG. 6A), an element including an LC layer in which beads are added to a liquid crystal (shown in FIG. 6B), an element including an LC layer in which microcapsules of liquid crystal are dispersed within a polymer (shown in FIG. 6C), or an element including an LC layer in which a liquid crystal material is appropriately disposed in a polymer matrix (shown in FIG. 6D) can be used. It is also applicable to form any of the above elements using substrates having concave or convex portions, e.g., microlenses.

(2) The first optical element 12 for substantially collimating the light from the light source 11

Figure 7:
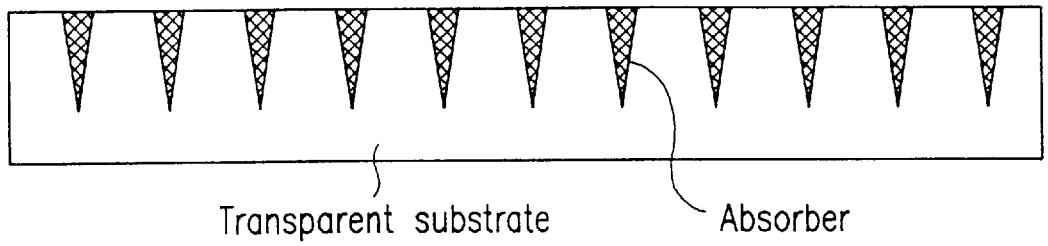
FIG. 7 is a cross-sectional diagram illustrating an example of a first optical element.

As the first optical element 12, for example, an element shown in FIG. 7 (see U.S. Pat. No. 4,621,898) that extracts direct components of light by the action of a groove (absorber) for absorbing scattered light provided in a transparent substrate can be used. Alternatively, a collimation film (see SID 95 DIGEST, 36.2 (p.793–796)) that collimates incident light by an optical fiber array arranged in two directions, or a substrate having certain convex or concave portions can be used.

It is also possible to employ an optical element which can be combined with the light source 11 to attain illumination light that has a certain directionality. For example, a light source providing telecentric illumination and a lens can be combined to implement the first optical element 12.

(3) LC display device 10

(3-1) In the first embodiment of the present invention, light going out through the LC display device 10 is controlled by the second optical element 13. Therefore, only the frontal characteristics of the liquid crystal display device 10 are important. Accordingly, an LC display device of a conventional mode such as TN, STN, ECB, or OCB can be used. An LC display device of a mode having relatively narrow viewing angle characteristics can also be used.

(3-2) In the second embodiment of the present invention, an LC display device of a mode having broad viewing angle characteristics can be suitably used, as well as the commonly-employed TN and STN modes. As an LC display device of a mode having broad viewing angle characteristics, an LC display device including liquid crystal molecules oriented in two or more different directions can be used, such as ① to ⑤ below:

① An LC display device having a polarizer and an LC layer including a substance for disturbing the twist in the orientation of liquid crystal molecules so as to average the orientation directions of the liquid crystal molecules with respect to the viewing angle, thereby improving the viewing angle characteristics thereof (e.g., that disclosed in Japanese Laid-Open Patent Publication No. 5-27242). The substance for disturbing the orientation of the liquid crystal molecules is a polymer network-like substance formed by adding a photocurable resin or the like to a liquid crystal and photopolymerizing the mixture. The network-like substance is discontinuously formed within the LC layer so as to include small interspaces therein. It may be formed as a number of small portions or projections.

② An LC display device having an LC layer including liquid crystal molecules oriented in an axially symmetrical manner (i.e., rotation symmetrically) in each pixel.

(i) An LC display device (e.g., that disclosed in Japanese Laid-open Patent Publications No.6-324337) including an alignment film on a substrate, the alignment film being subjected to an axially symmetrical or concentric alignment treatment with respect to each pixel can also be used. According to this method, the liquid crystal molecules are twisted by substantially 90° between substrates (TN mode), but the structure becomes axially symmetrical with respect to the normal axes of the substrates. Therefore, axially symmetrical viewing angle characteristics are realized. The axially symmetrical or concentric alignment treatment is performed by a usual rubbing treatment or more preferably by forming axially symmetrical or concentric microgrooves in an alignment film (microgroove pattern process).

(ii) An LC display device (e.g., those disclosed in Japanese Laid-open Patent Publications Nos.6-301015 and 7-120728) including an LC layer having liquid crystal regions corresponding to the respective pixels can also be used. In this device, each liquid crystal region is surrounded by a polymer wall such that the liquid crystal molecules are axially symmetrically oriented in each liquid crystal region.

In an LC display device having an LC layer including liquid crystal molecules oriented in an axially symmetrical manner, liquid crystal molecules are placed in an omnidirectional orientation state in each pixel by controlling the light irradiation for photopolymerizing a mixture which includes a liquid crystal and a photopolymerizable resin by means of a photomask or the like. In particular, by adding a chiral agent at the time of the photopolymerization, the liquid crystal molecules are oriented helically (spirally) around the normal axis of the substrate surface. By applying a voltage to the liquid crystal molecules in such an orientation state, the spiral orientation changes to a homeotropic state while maintaining the omnidirectionality, thereby remarkably improving the viewing angle characteristics.

③ An LC display device (e.g., that disclosed in Japanese Laid-open Patent Publications No.6-308496) including an alignment film of a crystalline polymer having a spherular structure can also be used. Since a number of crystallets are radially aligned with respect to a center in each spherular structure, the liquid crystal molecules are axially symmetrically oriented. As a result, a broad viewing angle characteristics mode is realized.

④ An LC display device (e.g., those disclosed in Japanese Laid-Open Patent Publication Nos.6-194655 and 5-27242) having an LC layer including randomly oriented liquid crystal molecules at the beginning of the twist (i.e., the substrate surface) can also be used. After applying an alignment film material on a substrate, an alignment film is formed without performing any alignment treatments such as rubbing, whereby the liquid crystal molecules are randomly oriented. As a result, the orientation of the liquid crystal molecules is averaged with respect to the viewing angle, thereby improving the viewing angle characteristics.

⑤ An LC display device (e.g., that disclosed in Japanese Laid-Open Patent Publication No.57-186735) including pixels each of which is divided into a plurality of regions (pixel division method) where the orientation of the liquid crystal molecules are controlled so that each region in the LC layer is imparted with independent viewing angle characteristics can also be used. By ensuring that the liquid crystal molecules in the respective divided regions have different orientations from region to region, they mutually compensate for the weak points in their respective viewing angle characteristics, thereby realizing broad viewing characteristics as a whole.

Figure 8:
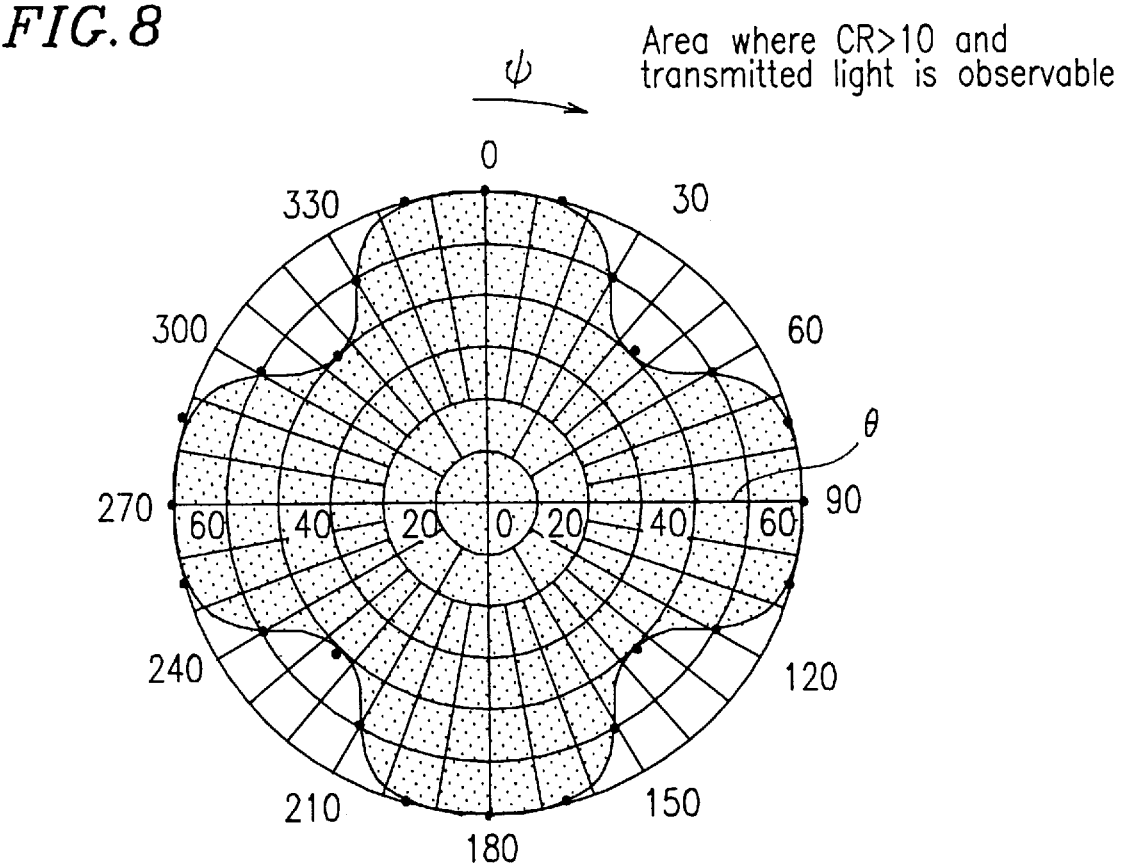
FIG. 8 is a diagram illustrating exemplary viewing angle characteristics of an LC display device including LC molecules axially symmetrically oriented in each pixel region.

Each of the LC display devices described in ①–⑤ above includes an LC cell interposed by a pair of polarizing plates disposed in a crossed-Nicol state, and the liquid crystal molecules take an orientation along the direction of the electric field when a saturation voltage is applied. As a result, the viewing angle dependence of the display characteristics for a black level is substantially identical among the LC display devices ①–⑤. Therefore, although having different display contrasts, the display modes ①–⑤ provide similar viewing angle characteristics. For example, the viewing angle characteristics of the LC display device described in ②(ii) are shown in FIG. 8. FIG. 8 is an equicontrast diagram in which the viewing angle direction with respect to the display screen of the LC display device is represented as (θ,φ). In FIG. 8, θ represents an angle with respect to the normal axis of the display screen (so that θ=0 indicates a direction perpendicular to the display screen), and φ represents an azimuth (so that φ=0 indicates the 12 o'clock direction on a clock face constituted by the display screen). The hatched portion in FIG. 8 represents an area in which the contrast ratio CR is greater than 10 and the transmitted light is observable. As seen from FIG. 8, the LC display device described in ②(ii) has sufficiently broad viewing angle characteristics.

Among the LC display devices ①–⑤, those in which the liquid crystal molecules are oriented in an axially symmetrical and continuous manner within each pixel (liquid crystal region) in the LC layer are particularly preferable because no disclination lines are generated within each pixel (which would cause leakage of light under a saturation voltage), thereby realizing a high contrast.

(Driving method for the LC display device)

The LC cell can be driven by a driving method such as a simple matrix driving or active matrix driving method although the present invention provides no limitation as to the driving method. As the switching elements for active matrix driving, a-Si TFTs, p-Si TFTs, and MIMs can be employed. Any of the above driving methods can be suitably selected as necessitated by the characteristics of the LC display device used.

(Substrate material of the LC display device)

As the substrate material, any transparent solid material can be used, e.g., glass or a polymer film.

In the case where a plastic substrate is employed, the substrate is preferably made of a material which does not absorb visible light, e.g., PET, acrylic polymers, polystyrene, or polycarbonate.

Furthermore, a laminated substrate combining two different types of substrates can be used. Alternatively, a laminated substrate combining two substrates (of either the same or different types) having different thicknesses can also be used.

In the case where a plastic substrate is employed, it is also possible to impart the substrate itself with a polarizing function, thereby creating an LC display device with an integrally formed polarizing plate.

Hereinafter, specific examples of the present invention will be described with reference to the accompanying figures. However, the present invention is not to be limited to these illustrative examples.

(Example 1)

(1) Construction of the second optical element 13

First, transparent electrodes of ITO (a complex of an indium oxide and a tin oxide, thickness: 0.05 μm) are formed on each of two PET substrates (thickness: 250 μm). A cell is constructed by attaching together the two PET substrates with spacers (average particle diameter: 12 μm) for securing a cell thickness interposed therebetween. Next, a mixture is prepared by homogeneously mixing the following substances: a polymer material containing 0.9 g of isobornyl acrylate (which is a photocurable resin); 0.1 g of trimethylol propane trimethacrylate (which is a multifunctional resin for enhancing the physical strength of the polymer); a liquid crystal material containing 4 g of E8 (manufactured by MERCK KGaA); and a photopolymerization initiator consisting of 0.03 g of Irgacure 651 (manufactured by CIBA-GEIGY Corporation). The homogenous mixture is then injected into the cell and the cell is irradiated with UV rays by using a high-pressure mercury lamp at 10 mW/cm$^2$ for 10 minutes, thereby forming an LC layer.

The second optical element 13 thus fabricated exhibits a transparent state when a voltage is applied thereto, and a scattering or diffusion state when no voltage is applied thereto.

The second optical element 13 is not limited to that described above, but can be any element which exhibits a transparent state when a voltage is applied thereto, and a scattering state when no voltage is applied thereto.

(2) Construction of the LC display apparatus 100

The light source 11, the first optical element 12 for substantially collimating light emitted from the light source 11, the LC display device 10 (An active matrix TN type LC display device, driven by TFTs), and the second optical element 13 are disposed as shown in FIGS. 2A and 2B.

(3) Display characteristics of the LC display apparatus 100

FIG. 9 shows the viewing angle characteristics of the LC display apparatus 100 with respect to the scattered state and the transparent state of the second optical element 13 (in an area where the contrast ratio CR>30 and the transmitted light is observable).

Figure 10A:
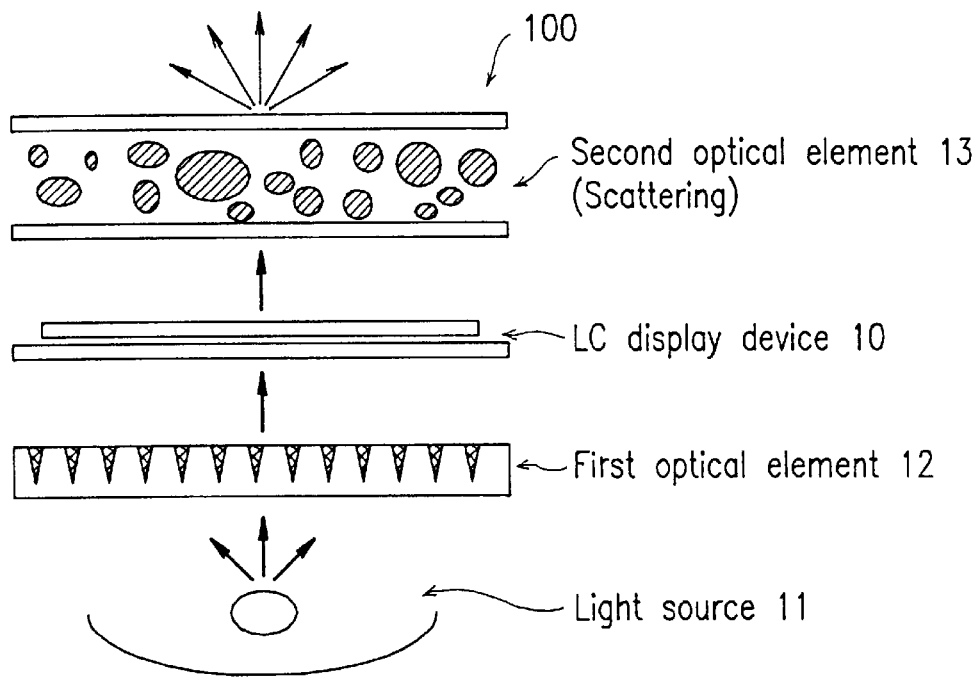
FIG. 10A is a view illustrating an LC display apparatus according to an example of the present invention.

When no voltage is applied to the second optical element 13, the second optical element 13 is in a scattering state as shown in FIG. 10A, so that the light which has passed through the LC display device 10 is scattered by the second optical element 13. As a result, as indicated by a region surrounded by ♦ in FIG. 9, uniform characteristics are obtained regardless of the azimuth angle at which the display screen of the LC display apparatus 100 is observed, and high-contrast viewing angle characteristics are obtained even at oblique viewing angles (i.e., away from the normal axis of the display screen).

Figure 10B:
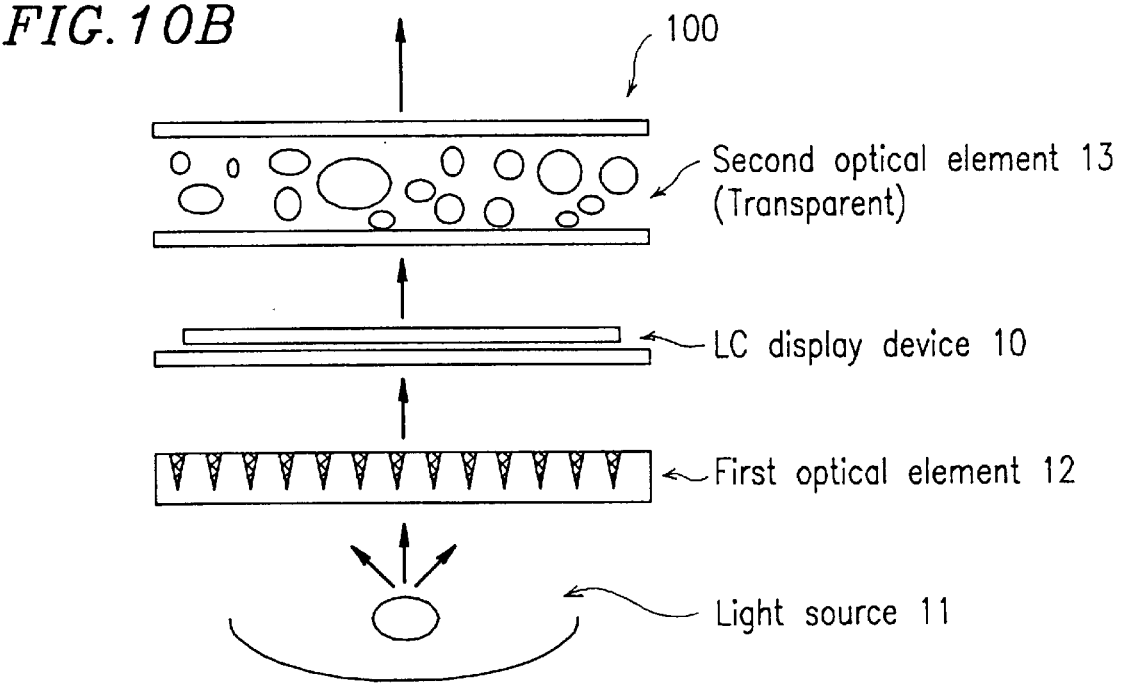
FIG. 10B is a view illustrating an LC display apparatus according to an example of the present invention.

When a voltage is applied to the second optical element 13, the second optical element 13 is in a transparent state as shown in FIG. 10B, so that the light which has passed through the LC display device 10 directly passes through the second optical element 13. As a result, as indicated by a region surrounded by ■ in FIG. 9, the LC display apparatus 100 has narrow viewing angle characteristics.

Thus, by electrically controlling the second optical element 13 based on the application of a voltage, the viewing angle characteristics of the LC display apparatus 100 can be adjusted to become broad or narrow.

Furthermore, by placing the second optical element 13 in a gray scale tone state, the LC display apparatus 100 can have viewing angle characteristics of a nature which is between the broad characteristics (under the scattering state of the second optical element 13) and the narrow characteristics (under the transparent state of the second optical element 13). Thus, the viewing angle characteristics of the LC display apparatus 100 can be set according to the preferences and needs of the user.

(Example 2)

Example 2 describes a case where, under the same construction of the LC display apparatus 100 of Example 1 (see FIGS. 10A and 10B), light collimated in the optimum contrast direction for the LC display device 10 (an active matrix TN type LC display device) is provided as the collimated light from the first optical element 12. Assuming that the optimum contrast direction for the LC display device 10 is a direction at an angle of about 10° with respect to the normal axis of the LC display device 10, the first optical element 12 is disposed at an angle of 10° with respect to the LC display device 10. Thus, the first optical element 12 collimates the light from the light source 11 in the optimum contrast direction for the LC display device 10. It is also possible to attain this effect by employing a combination of lenses or the like.

Figure 11:
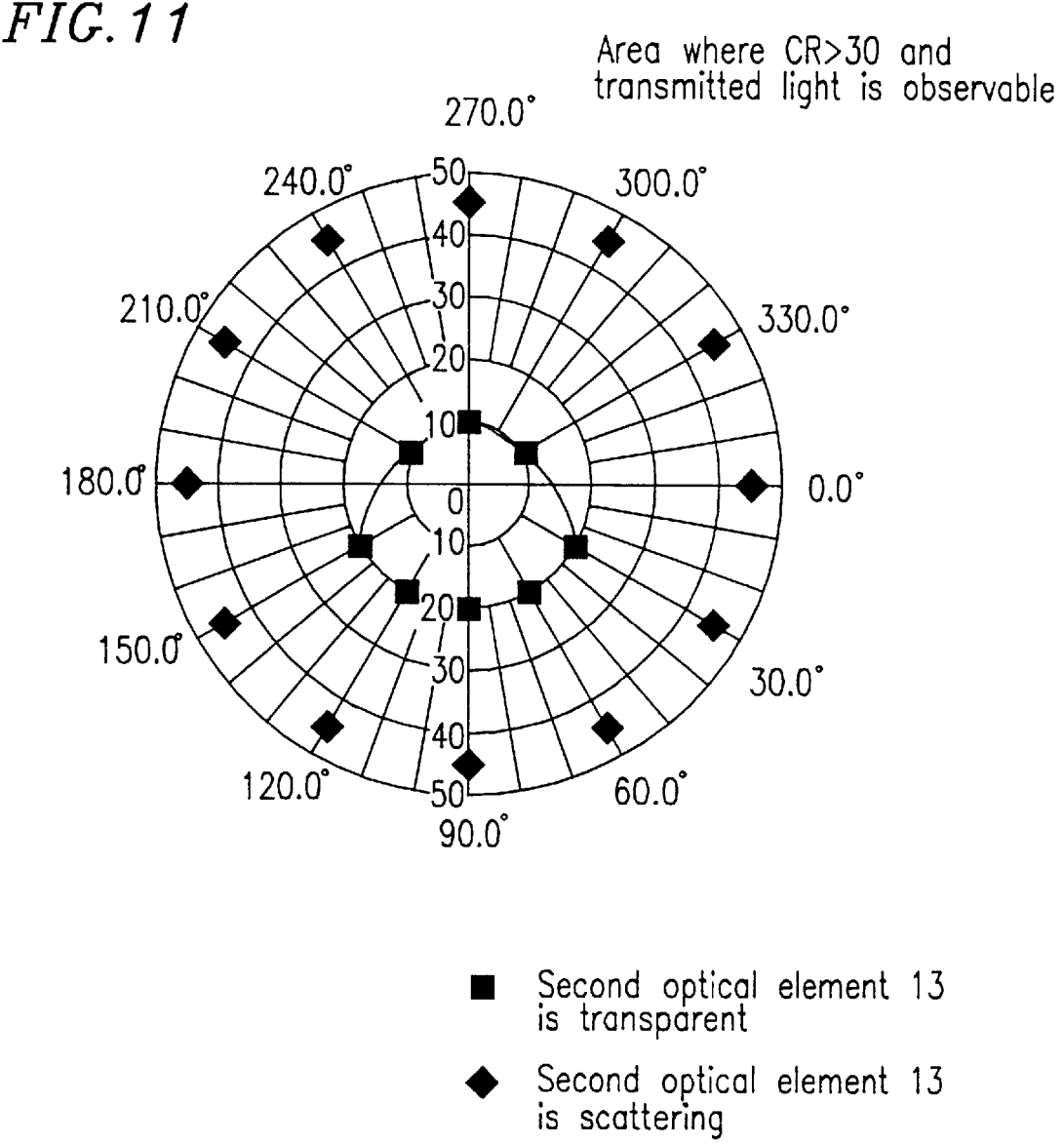
FIG. 11 is a graph illustrating exemplary viewing angle characteristics of an LC display apparatus according to an example of the present invention.

FIG. 11 shows the viewing angle characteristics of the LC display apparatus 100 with respect to the scattering state or the transparent state of the second optical element 13 according to the present example.

When no voltage is applied to the second optical element 13, the second optical element 13 is in a scattering state so that broad viewing angle characteristics are obtained (as indicated by a region surrounded by ♦ in FIG. 11) as in the case of Example 1. When a voltage is applied to the second optical element 13, the second optical element 13 is in a transparent state so that the LC display apparatus 100 has even narrower viewing angle characteristics (as indicated by a region surrounded by ■ in FIG. 11) than the LC display apparatus 100 of Example 1 and improved brightness in a direction at an angle of 10° with respect to the normal axis of the LC display apparatus 100.

FIG. 12 shows the viewing angle characteristics obtained by the LC display apparatus 100 (having the same construction as that of the LC display apparatus 100 of Example 1). The light from the light source 11 is collimated at an angle of about 20° with respect to the normal axis of the LC display device 10 (an active matrix TN type LC display device).

When no voltage is applied to the second optical element 13, the second optical element 13 is in a scattering state so that broad viewing angle characteristics are obtained (as indicated by a region surrounded by ♦ in FIG. 12) as in the case of Example 1. When a voltage is applied to the second optical element 13, the second optical element 13 is in a transparent state so that the LC display apparatus 100 has viewing angle characteristics indicated by a region surrounded by ■ in FIG. 12 and improved brightness in a direction at an angle of 20° with respect to the normal axis of the LC display apparatus 100.

By thus improving the brightness of the LC display apparatus 100 in only a specific direction, it becomes possible to prevent viewing from directions other than that specific direction. This principle can be utilized for preventing a car driver from viewing the image displayed on a car navigation device during driving.

(Example 3)

Figure 13A:
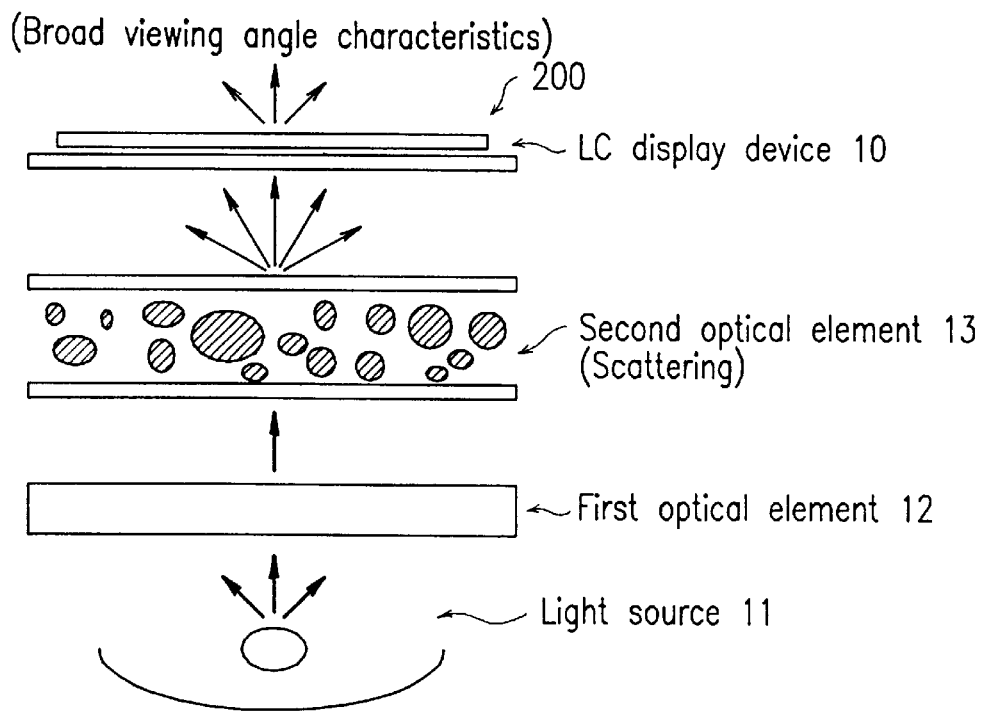
FIG. 13A is a view illustrating an LC display apparatus according to an example of the present invention.
Figure 13B:
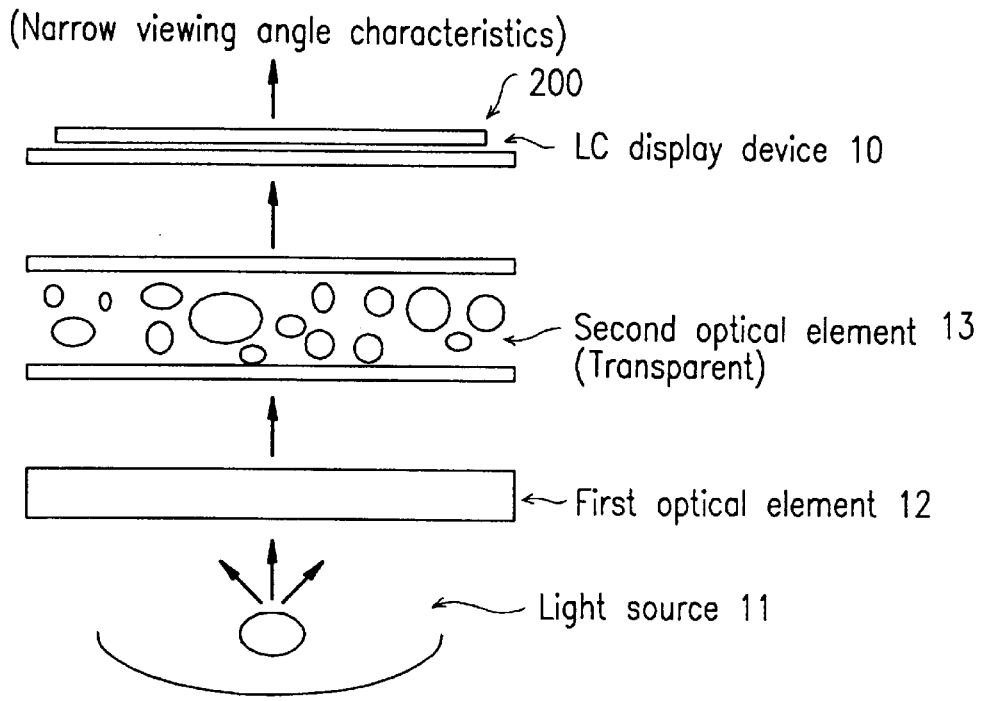
FIG. 13B is a view illustrating an LC display apparatus according to an example of the present invention.

An LC display apparatus 200 is produced by using the first and second optical elements 12 and 13 of S96300 Example 1, the second optical element 13 being interposed between the LC display device 10 and the first optical element 12 as illustrated in FIGS. 13A and 13B. In the present example, as described above, the viewing angle characteristics of the LC display device 10 itself are exhibited in a broad viewing angle mode (i.e., when the second optical element 13 is in a scattering or diffusion state). An LC display device having appropriate viewing angle characteristics for the purposes and the requirements can be adopted as the LC display device 10.

Figure 14A:
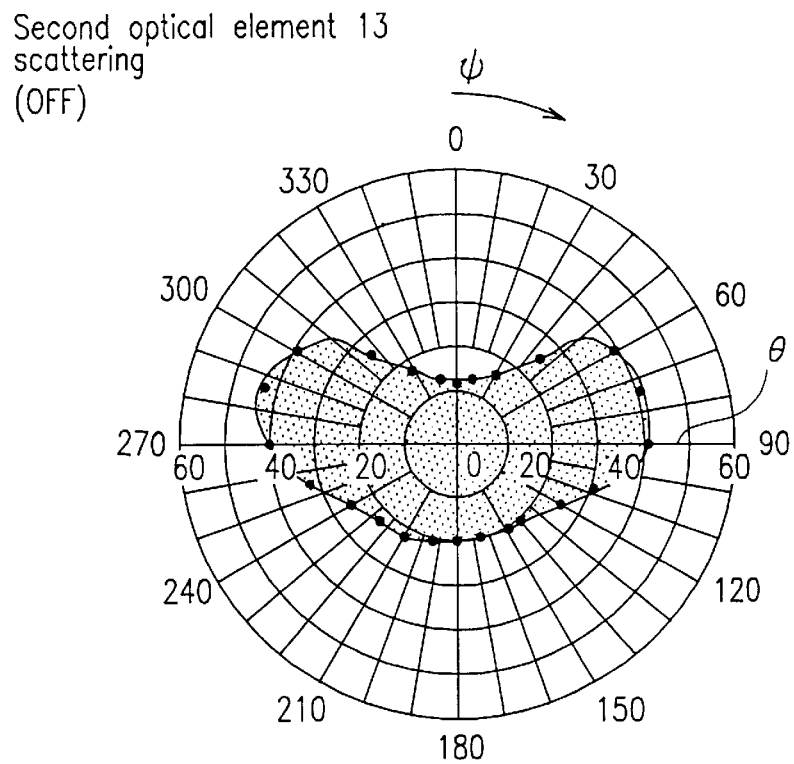
FIG. 14A is a diagram illustrating the change in the viewing angle characteristics of an LC display apparatus according to an example of the present invention.

When no voltage is applied to the second optical element 13, the second optical element 13 is in a scattering state as shown in FIG. 13A, so that the light entering the LC display device 10 is scattered by the second optical element 13. As a result, the display characteristics of the LC display apparatus 200 (in an area where the contrast ratio CR>10 and the transmitted light is observable) are equivalent to the viewing angle characteristics of the LC display device 10 itself, as shown in FIG. 14A.

Figure 14B:
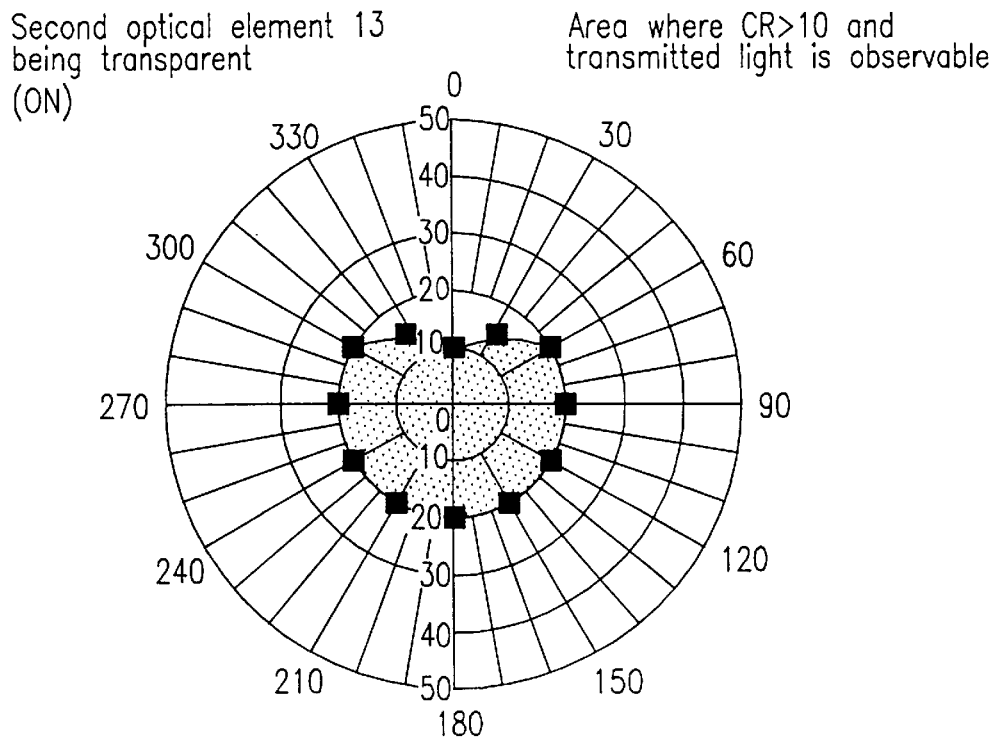
FIG. 14B is a diagram illustrating the change in the viewing angle characteristics of an LC display apparatus according to an example of the present invention.

When a voltage is applied to the second optical element 13, the second optical element 13 is in a transparent state as shown in FIG. 13B, so that substantially collimated light enters the LC display device 10 in a substantially perpendicular manner. As a result, the display characteristics of the LC display apparatus 200 (in an area where the contrast ratio CR>10 and the transmitted light is observable) are limited to relatively narrow viewing angle characteristics, as shown in FIG. 14B. As seen from FIGS. 14A and 14B, the viewing angle characteristics of the LC display panel when viewed from side directions vary substantially. Therefore, in the narrow viewing angle mode, the image displayed by the LC display apparatus 200 cannot be viewed by anyone other than the user thereof.

Thus, by electrically controlling the second optical element 13 based on the application of a voltage, the viewing angle characteristics of the LC display apparatus 200 can be adjusted to become broad or narrow. Furthermore, by placing the second optical element 13 in a gray scale tone state, the LC display apparatus 200 can have viewing angle characteristics of a nature which is between the broad characteristics (under the scattering state of the second optical element 13) and the narrow characteristics (under the transparent state of the second optical element 13). Thus, the viewing angle characteristics of the LC display apparatus 200 can be set according to the preferences and needs of the user.

Although the light from the light source 11 is collimated so as to enter the LC display device 10 substantially perpendicularly in the above-described example, it is also possible to collimate the light from the light source 11 so as to enter the LC display device 10 at an angle with respect to the normal axis thereof, according to the specific purposes or requirements.

(Example 4)

In the present example, an LC display apparatus 100 is produced by using as the LC display device 10 an STN type LC cell (with a color filter), instead of the TN type LC cell used in Example 1. The viewing angle characteristics of the resultant LC display apparatus 100 can also be controlled by controlling the voltage applied to the second optical element 13, as in the case of Example 1.

(Example 5)

In the present example, an LC display apparatus 200 is produced by using an LC display device 10 which includes an LC layer having liquid crystal regions corresponding to the respective pixels, each liquid crystal region being surrounded by a polymer wall, such that the liquid crystal molecules are axially symmetrically oriented in each liquid crystal region.

First, transparent electrodes of ITO (thickness: 500 angstroms) are formed on each of two glass substrates (thickness: 1.1 mm). Switching elements are formed on one of the glass substrates to construct a TFT substrate, whereas the other glass substrate is constructed as a color filter substrate.

Figure 15:
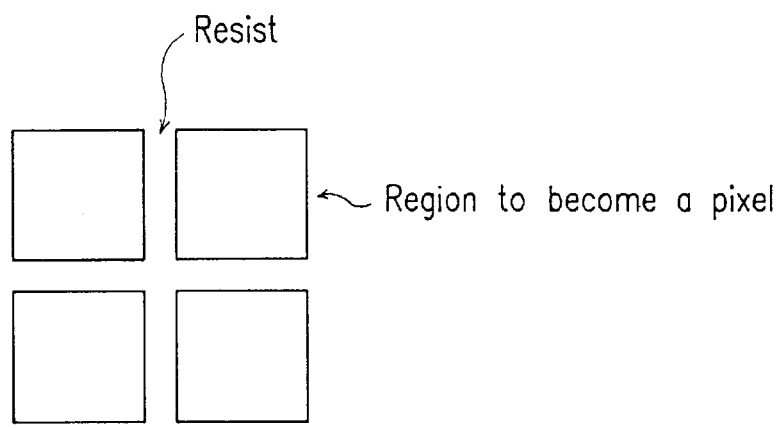
FIG. 15 is a diagram illustrating a resist pattern formed on a TFT substrate employed in an example of the present invention.

Next, a wall having the structure shown in FIG. 15 is produced by using a resist material (OMR83: manufactured by Tokyo Ohka Kogyo co., Ltd.). The resist wall is employed for separating a liquid crystal portion from a monomer portion. Each region surrounded by the resist wall substantially corresponds to a pixel. Next, a cell is constructed by attaching together the TFT substrate and the color filter substrate, with spacers (average particle diameter: 5 $\mu$m) for securing a cell thickness interposed therebetween.

Next, a mixture is prepared by homogeneously mixing the following substances: 0.20 g of R-684 (manufactured by Nippon Kayaku Co., Ltd.: a multifunctional resin for enhancing the physical strength of the polymer); 0.20 g of p-phenylstyrene (which is a photopolymerization suppressor); a liquid crystalline photocurable resin containing 0.10 g of Compound A represented by Formula 1 below; a liquid crystal material containing 4.5 g of ZLI-4792 (manufactured by MERCK KGaA, having an anisotropy of refractive index $\Delta n=0.094$); and a photopolymerization initiator containing 0.025 g of Irgacure 651 (manufactured by CIBA-GEIGY Corporation). After the homogenous mixture is injected into the cell by capillary action, the temperature of the cell is increased so that a uniform phase is obtained.

$$CH_2=CH-COO-(CH_2)_{12}-O-\underset{}{\underset{}{\bigcirc}}-\underset{F}{\underset{F}{\bigcirc}}$$ [Formula 1]

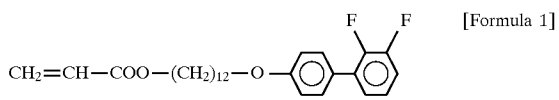

Thereafter, the cell is cooled down so that one liquid crystal region is formed corresponding to each pixel. Specifically, when the cell is cooled, a liquid crystal phase is generated in regions surrounded by the resist wall and a number of liquid crystal phase regions merge with one another so as to avoid the resist, whereby one pixel region results for each pixel. By applying a voltage to the liquid crystal and stopping the application of the voltage at an appropriate time, the liquid crystal molecules are placed in an axially symmetrical orientation state.

The cell is further cooled down to room temperature. In order to stabilize the axially symmetrical orientation, the cell is irradiated with UV rays by using a high-pressure mercury lamp at 3 mW/cm² (wavelength: 365 nm) for 30 minutes, thereby forming an LC layer. Thereafter, by continuing the UV irradiation for 20 more minutes, the resin within the mixture, composed of R-684, p-phenylstyrene, and Compound A, is cured. A polymer wall is formed of the cured resin.

Figure 16:
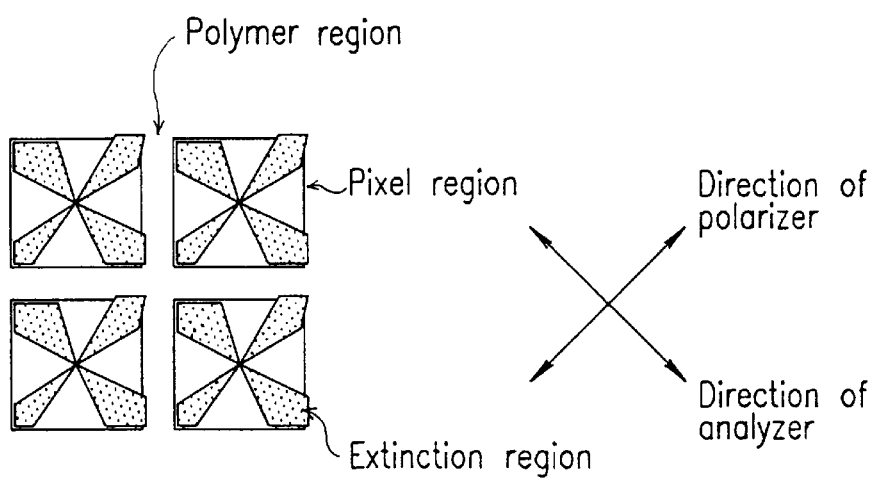
FIG. 16 is a diagram illustrating the orientation state of LC molecules (as observed with a polarizing microscope) in an LC display device according to an example of the present invention.

The LC cell thus fabricated was observed with a polarizing microscope. The observation showed that, as shown in FIG. 16, a liquid crystal region was formed substantially corresponding to the resist pattern and that the liquid crystal molecules were oriented in an axially symmetrical manner in each liquid crystal region with respect to an axis extending through the center of the liquid crystal region. When the LC cell having an axially symmetrical orientation is observed with a polarizing microscope, regions in which the polarization axis does not coincide with the orientation of the liquid crystal molecules are seen to be present. Such regions are observed as light extinction regions (as shown in FIG. 16) where the light transmittance is reduced.

The LC display apparatus 200 having the structure shown in FIGS. 4A and 4B is constructed using the display device 10 fabricated in the above-mentioned manner.

Figure 17A:
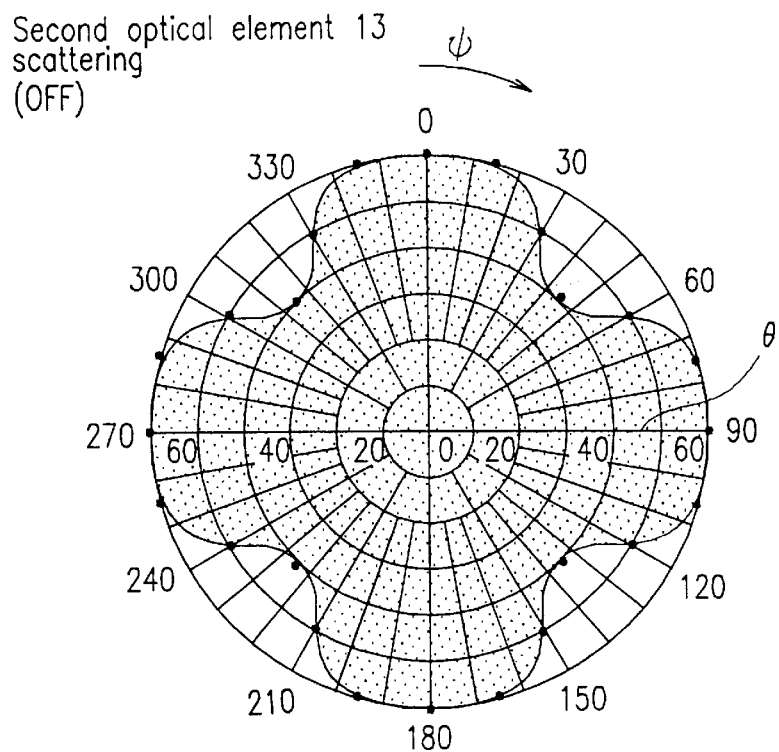
FIG. 17A is a diagram illustrating the change in the viewing angle characteristics of an LC display apparatus according to an example of the present invention.

FIG. 17A shows the viewing angle characteristics of the LC display apparatus 200 (in an area where the contrast ratio CR>10 and the transmitted light is observable) when no voltage is applied to the second optical element 13 (i.e., "OFF" state). Since the second optical element 13 in the "OFF" state is in a scattering state, the light entering the LC display device 10 is scattered. As a result, the display characteristics of the LC display apparatus 200 are equivalent to the viewing angle characteristics of the LC display device 10 itself.

Figure 17B:
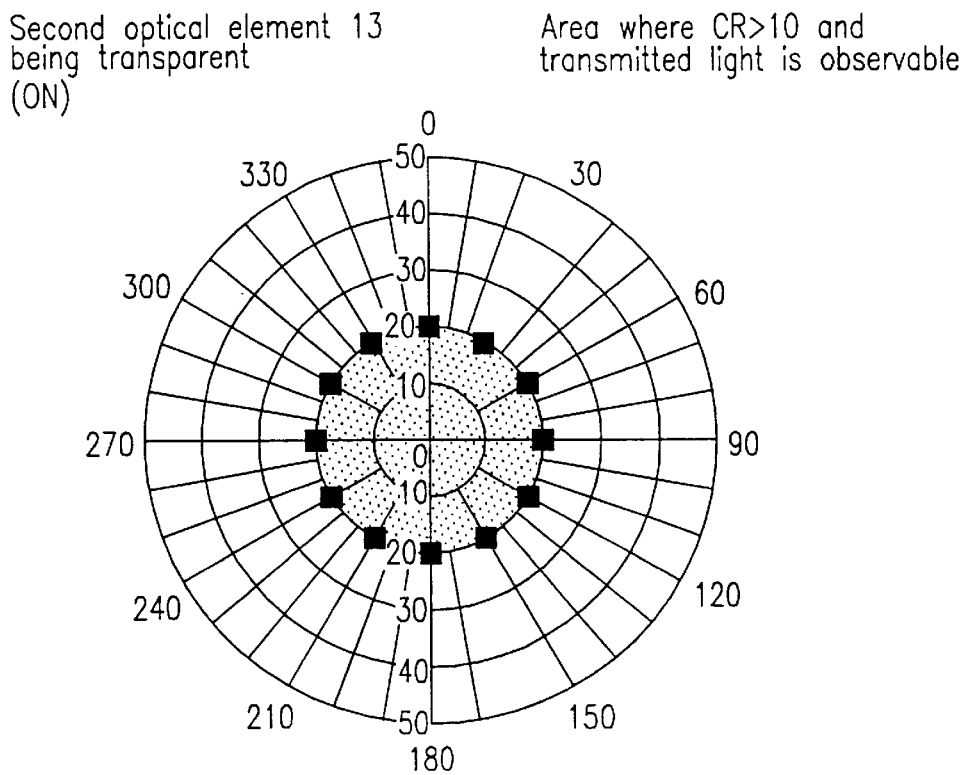
FIG. 17B is a diagram illustrating the change in the viewing angle characteristics of an LC display apparatus according to an example of the present invention.

FIG. 17B shows the viewing angle characteristics of the LC display apparatus 200 (in an area where the contrast ratio CR>10 and the transmitted light is observable) when a voltage is applied to the second optical element 13 (i.e., "ON" state). Since the second optical element 13 in the "ON" state is in a transparent state, the light substantially collimated by the first optical element 12 enters the LC display device 10 in a substantially perpendicular manner. As a result, the viewing characteristics of the LC display apparatus 200 (in the area where the contrast ratio CR>10 and the transmitted light is observable) are relatively narrow as shown in FIG. 17B.

As seen from FIGS. 17A and 17B, the viewing angle characteristics of the LC display panel drastically vary from the broad viewing angle mode to the narrow viewing angle mode. Thus, by electrically controlling the second optical element 13 based on the application of a voltage, the viewing angle characteristics of the LC display apparatus 200 can be adjusted to become broad or narrow. Furthermore, by placing the second optical element 13 in a gray scale tone state, the LC display apparatus 200 can have viewing angle characteristics of a nature which is between the broad characteristics (under the scattering state of the second optical element 13) and the narrow characteristics (under the transparent state of the second optical element 13). Thus, the viewing angle characteristics of the LC display apparatus 200 can be set according to the preferences and needs of the user.

Although the light from the light source 11 is collimated so as to enter the LC display device 10 substantially perpendicularly in the above-described example, it is also possible to collimate the light from the light source 11 so as to enter the LC display device 10 at an angle with respect to the normal axis thereof, according to the specific purposes or requirements of the application.

(Example 6)

In the present example, an LC display apparatus 200 is produced by using an LC display device 10 having broad viewing angle characteristics due to spherulites formed in an alignment film.

First, transparent electrodes of ITO (thickness: 0.05 μm) are formed on each of two glass substrates (thickness: 1.1 mm). Switching elements are formed on one of the glass substrates to construct a TFT substrate, whereas a color filter is formed on the other glass substrate and then a film of ITO is sputtered thereon to construct a counter substrate.

Next, Nylon 66 is coated on both substrates by spin coating so as to form alignment films having a spherular structure. No rubbing is performed. The reason for using Nylon 66 is that Nylon 66 is highly crystallized so that spherulites can easily form therein. As the alignment film material, any highly crystallized organic material can be used. The spherulites can be formed by heating the melted or dissolved alignment films to above the glass transition temperature Tg thereof so as to crystallize the alignment films. It is also possible to adopt an alignment film having a spherular structure for one substrate and an ordinary alignment film for the other substrate.

Next, a cell is constructed by attaching together the two substrates with spacers (average particle diameter: 5 μm) for securing a cell thickness interposed therebetween. A liquid crystal material ZLI-4792 (manufactured by MERCK KGaA, with a chiral agent S811 added thereto so as to adjust the helical pitch to be 90°) is injected into this cell. The liquid crystal molecules in the LC layer of the display device 10 thus fabricated are axially symmetrically oriented along the spherular structure of the alignment film on the substrate (s).

An LC display apparatus 200 having the structure shown in FIGS. 4A and 4B is constructed by employing the LC display device 10 fabricated in the above-mentioned manner. The viewing angle characteristics of the LC display apparatus 200 of Example 6 can also be controlled by controlling the voltage applied to the second optical element 13, as in the case of the LC display apparatus 200 of Example 3.

(Example 7)

In the present example, an LC display apparatus 200 is produced by using an LC display device 10 in which the liquid crystal molecules in the LC layer are randomly oriented.

First, transparent electrodes of ITO (thickness: 0.05 μm) are formed on each of two glass substrates (thickness: 1.1 mm). Switching elements are formed on one of the glass substrates to construct a TFT substrate, whereas the other glass substrate is constructed as a color filter substrate.

Next, polyimide is coated on both substrates by spin coating so as to form alignment films. No rubbing is performed. As a result, the alignment films are randomly oriented.

Next, a cell is constructed by attaching together the two substrates with spacers (average particle diameter: 5 μm) for securing a cell thickness interposed therebetween. A liquid crystal material ZLI-4792 (manufactured by MERCK KGaA, with a chiral agent S811 added thereto so as to adjust the helical pitch to be 90°) is then injected into this cell. The liquid crystal molecules in the LC layer of the display device 10 thus fabricated are randomly oriented due to the small orientation restriction force of the alignment films on the substrates.

An LC display apparatus 200 having the structure shown in FIGS. 4A and 4B is constructed by employing the LC display device 10 fabricated in the above-mentioned manner. The viewing angle characteristics of the LC display apparatus 200 of Example 7 can also be controlled by controlling the voltage applied to the second optical element 13, as in the case of the LC display apparatus 200 of Example 3.

Furthermore, in Examples 3, 5, 6, and 7, the second optical element 13 is disposed on side of the first optical element 12 closer to the backlight, instead of on the viewer's side. Therefore, the ambient light around the LC display apparatus 200 does not directly enter the second optical element 13. As a result, the reflection at the display screen face does not vary even in a bright environment, irrespective of the transparent, scattering, or any intermediate gray scale state of the second optical element 13, thereby maintaining excellent display characteristics.

(Example 8)

Example 8 of the present invention will be described with reference to FIGS. 18 to FIGS. 24A and 24B.

Figure 18:
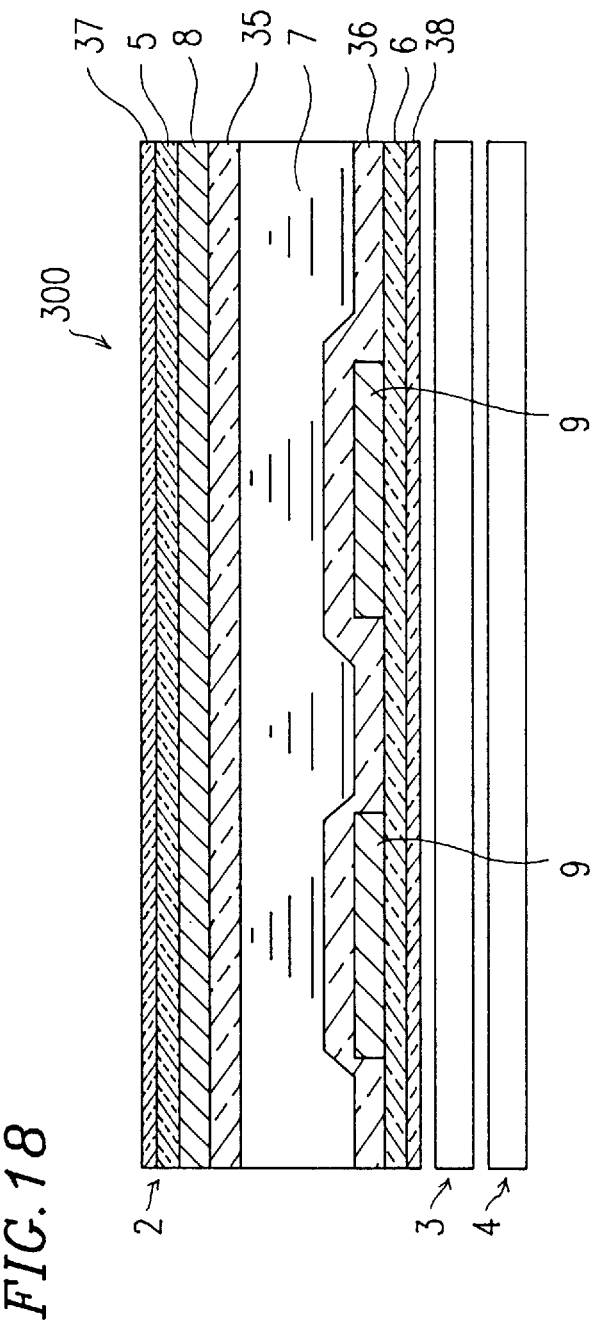
FIG. 18 is a schematic cross-sectional view showing the structure of an LC display apparatus according to an example of the present invention.

As shown in FIG. 18, an LC display apparatus 300 includes an LC display device 2, a scattering control element 3, and an illumination device (backlight) 4.

The LC display device 2 includes an LC layer 7 composed of nematic liquid crystal or the like, the LC layer 7 being interposed between a pair of opposing substrates 5 and 6 composed of glass or the like. On a side of the substrate 5 facing the LC layer 7 are formed a transparent electrode layer 8 and an alignment film 35. On a side of the substrate 6 facing the LC layer 7 are formed a transparent electrode layer 9 and an alignment film 36. The transparent electrode layers 8 and 9 are formed of an ITO or the like. The alignment films 35 and 36 are formed of polyimide, polyvinyl alcohol or the like. The liquid crystal composing the LC layer 7 is sealed between the substrates 5 and 6 by means of a sealant (not shown) composed of resin or the like. Polarizers 37 and 38 are disposed on the outside of the substrates 5 and 6, respectively.

A voltage can be applied to the transparent electrode layers 8 and 9 by a liquid crystal driving means (not shown). The light emitted from the illumination device 4 and travelling through the LC display device 2 is modified by the changing orientation states of the liquid crystal molecules in the LC layer 7 depending on whether or not a voltage is applied thereto. The light transmitted through the LC display device 2 is fed to the display screen defined by the substrate 5, whereby an image is displayed.

Figure 19:
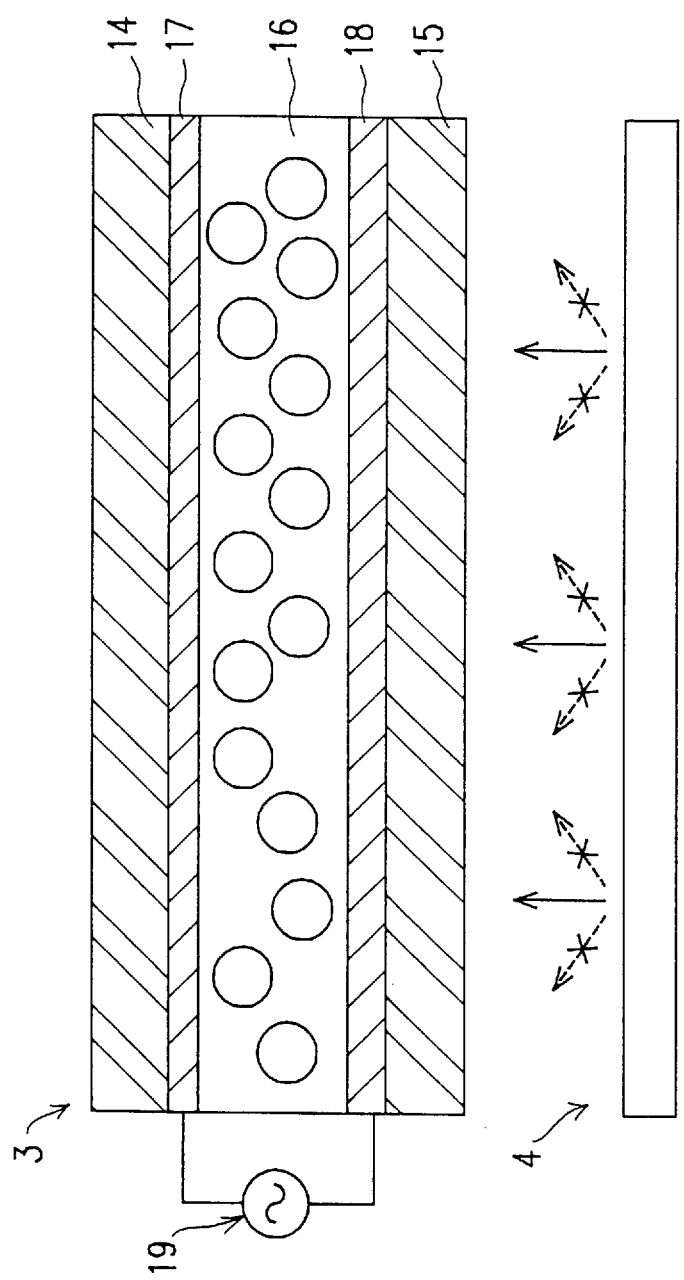
FIG. 19 is a schematic cross-sectional view showing the structure of an illumination device and a scattering control element in the LC display apparatus shown in FIG. 18.

The scattering control element 3 is disposed between the LC display device 2 and the illumination device 4. Alternatively, the scattering control element 3 can be disposed by the side of the LC display device 2 closer to the substrate 5. As shown in FIG. 19, the scattering control element 3 includes a pair of opposing substrates 14 and 15 and an LC layer 16 interposed therebetween. The LC layer 16 is composed essentially of a liquid crystal capable of controlling the scattering of light, e.g., a polymer dispersed type liquid crystal or a DSM (Dynamic Scattering Mode) type liquid crystal. The substrates 14 and 15 are composed of a material having optical isotropy, e.g., glass or transparent polymer films. A transparent electrode layer 17 (composed of ITO or the like) is disposed on the side of the substrate 14 facing the LC layer 16. A transparent electrode layer 18 (composed of ITO or the like) is disposed on the side of the substrate 15 facing the LC layer 16.

A voltage can be applied between the transparent electrode layers 17 and 18 by means of an LC driving means 19. The scattering of light travelling through the scattering control element 3 (emitted from the illumination device 4) is controlled by the liquid crystal molecules composing the LC layer 16 depending on whether or not a voltage is applied thereto. When no voltage is applied between the transparent electrode layers 17 and 18, the liquid crystal molecules of the LC layer 16 are in a scattering state. When a predetermined voltage is applied between the transparent electrode layers 17 and 18 by the LC driving means 19, the liquid crystal molecules of the LC layer 16 are in a transparent state. When the liquid crystal molecules are in a scattering state, the light from the illumination device 4 is scattered as it travels through the LC layer 16. When the liquid crystal molecules are in a transparent state, the light from the illumination device 4 is not scattered as it travels through the LC layer 16. The light which has travelled through the scattering control element 3 is lead to the LC display device 2 via the substrate 6.

Figure 20:
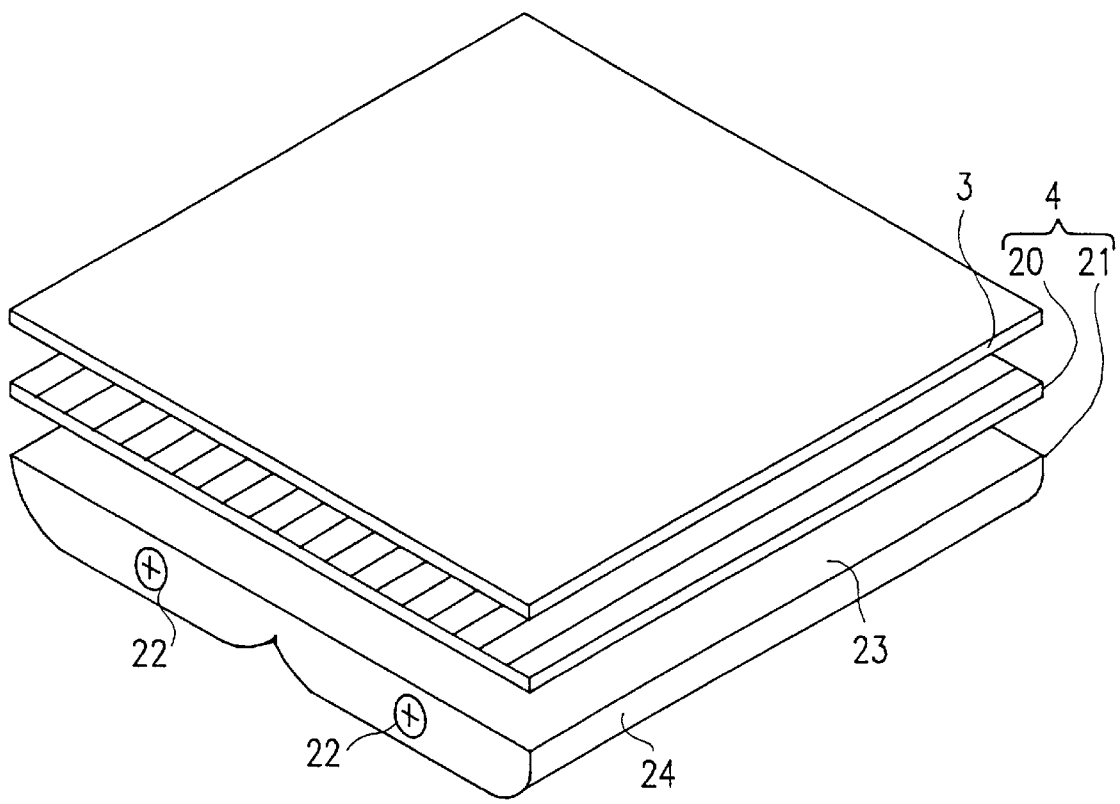
FIG. 20 is a perspective view showing the relative positions of an irradiation section, a sheet having light-shielding slits, and a scattering control element in the LC display apparatus shown in FIG. 18.

The illumination device 4 is disposed closer to the substrate 15 of the scattering control element 3. As shown in FIG. 20, the illumination device 4 includes a sheet having light-shielding slits (transmissive sheet body) 20 and an irradiation section 21. The irradiation section 21 includes a light source 22 (e.g., a fluorescent light), a light-outgoing face 23 through which light from the light source 22 goes out to the sheet 20, and a reflection sheet 24 for reflecting light from the light source 22. The reflection sheet 24 is disposed opposite the light-outgoing face 23. The light emitted from the light source 22 is radiated on the scattering control element 3 through the sheet 20.

Although the irradiation section 21 shown in FIG. 20 has a so-called direct view backlight type structure, the irradiation section 21 can have any other structure.

Figure 21A:
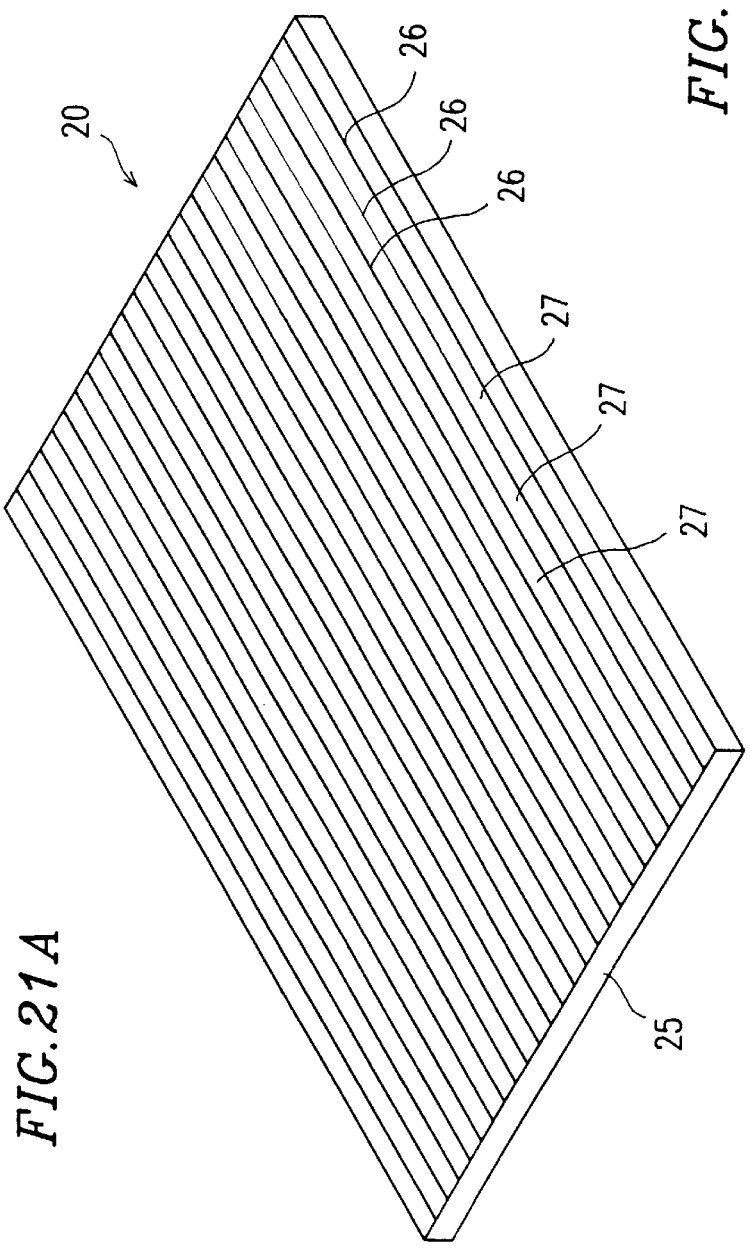
FIG. 21A is a schematic perspective view showing the structure of a sheet having light-shielding slits incorporated in the LC display apparatus shown in FIG. 18.

The sheet 20 having light-shielding slits is interposed between the scattering control element 3 and the irradiation section 21. The sheet 20 shields a portion of the incident light travelling through the light-outgoing face 23, whereby the transmitted light becomes highly collimated. As shown in FIG. 21A, the sheet 20 includes a plurality of light-shielding members 26 disposed parallel to one another on one face of a light-transmitting sheet 25. The light-shielding members 26 extend along the vertical direction of the display screen. The portions where the light-shielding members 26 are not provided define slits 27 for transmitting the light from the irradiation section 21.

Figure 21B:
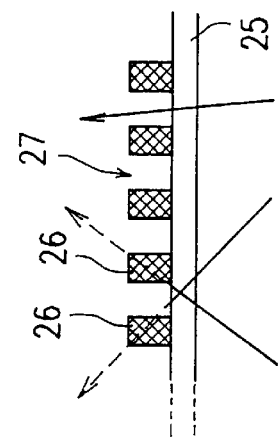
FIG. 21B is a diagram illustrating the light-shielding action of the sheet having light-shielding slits for light entering obliquely with respect to the sheet surface.

The light-shielding members 26 can be formed on the side of the sheet 25 from which the light from the irradiation section 21 enters, or the opposite side thereof (i.e., facing the scattering control element 3). FIG. 21B illustrates an example where the light-shielding members 26 are provided on the side of the sheet 25 facing the scattering control element 3.

As shown in FIG. 21B, the sheet 20 having light-shielding slits 27 functions to transmit the light entering perpendicularly (or substantially perpendicularly) to the sheet 20 without being modified, while shielding components of the light which enter the sheet 20 substantially obliquely with respect to the light-shielding members 26. As a result, the light transmitted through the sheet 20 is converted into uniform light having a directionality along the direction substantially perpendicular to the sheet 20. In other words, the sheet 20 functions to provide light which is highly collimated along the direction substantially perpendicular to the surface of the sheet 20. Thus, highly collimated light is emitted from the illumination device 4 toward the LC display device 2 in the LC display apparatus 300 of the present example.

When the LC layer 16 of the scattering control element 3 in the LC display apparatus 300 having the above structure is in a scattering state, the highly collimated light L1 from the illumination device 4 is scattered by the scattering control element 3 (as shown in FIG. 22). The light L2, which has been transmitted through the scattering control element 3, has characteristics similar to those of light which has been transmitted through a conventional diffusion sheet, so that it enters the LC display device 2 in a uniformly diffused state. As a result, the light L3 which has been transmitted through the LC display device 2 goes out substantially omnidirectionally, i.e., in all viewing directions, from the display screen, so that the displayed image can be viewed even from directions other than the orthogonal direction with respect to the display screen.

On the other hand, when the LC layer 16 of the scattering control element 3 is in a transparent state, the highly collimated light L1 from the illumination device 4 is not scattered by the scattering control element 3 (as shown in FIG. 22). Rather, the light L2 which has been transmitted through the scattering control element 3 enters the LC display device 2 in a highly collimated state (see FIG. 23). As a result, the light L3 which has been transmitted through the LC display device 2 goes out only along a viewing direction normal to the display screen and/or along directions within a plane which is normal to the display screen and includes the longitudinal direction of the light-shielding members 26. Therefore, no light is transmitted in oblique directions (e.g., right or left along the horizontal direction) so that the displayed image cannot be viewed along such directions. As a result, only a viewer situated orthogonally with respect to the display screen can recognize the displayed image.

As described above, in accordance with the LC display apparatus 300 having the above-mentioned structure, the scattering of light can be controlled by the scattering control element 3 so that the viewing angle characteristics of any displayed image can be controlled. Furthermore, since highly collimated light from the illumination device 4 can be emitted toward the LC display device 2, the LC display apparatus 300 provides viewing angle characteristics such that only a viewer situated orthogonally with respect to the display screen can recognize the displayed image when the LC layer 16 is in a transparent state. Thus, the LC display apparatus 300 can be arbitrarily switched between a state of minimal viewing angle dependence (i.e., uniform display characteristics over substantially all the viewing angles) and a state which allows only a viewer situated orthogonally with respect to the display screen to recognize the displayed image.

Figure 24A:
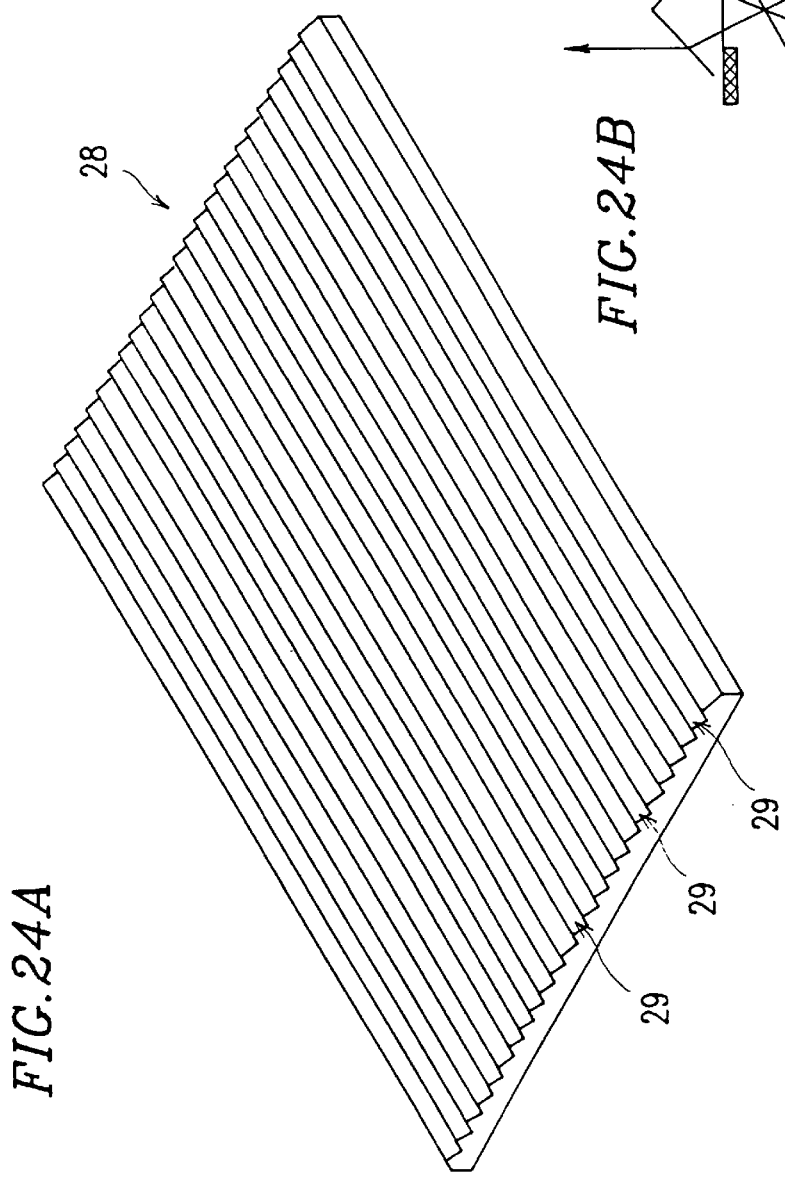
FIG. 24A is a schematic perspective view showing the structure of a prism sheet having light-shielding slits.

Furthermore, it is also applicable to provide a prism sheet 28 having light-shielding slits (as shown in FIG. 24A), instead of the sheet 20 having light-shielding slits, in the LC display apparatus 300 of the above structure.

The prism sheet 28 having light-shielding slits is interposed between the scattering control element 3 and the irradiation section 21, as was the sheet 20. As shown in FIG. 24A, the prism sheet 28 includes a plurality of grooves 29 (having a roughly V-shaped cross section) extending parallel to one another on a face closer to the scattering control element 3 (i.e., opposite the face through which the light from the irradiation section 21) enters. The grooves 29 extend along a direction parallel to the screen surface.

Figure 24B:
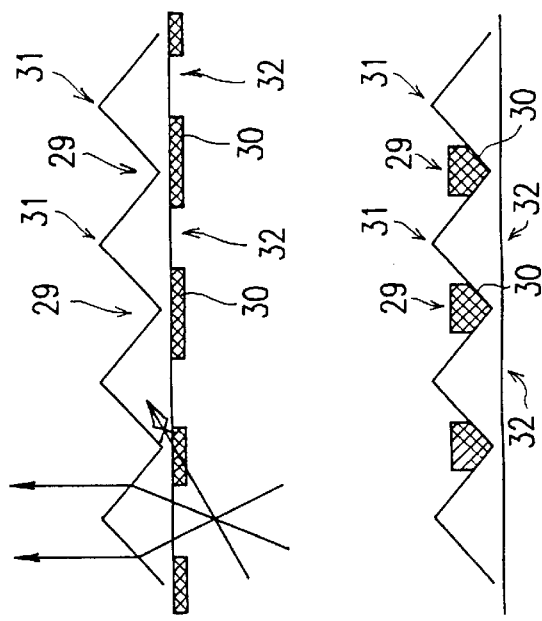
FIG. 24B is a diagram illustrating the light-shielding action of the prism sheet having light-shielding slits for light entering obliquely with respect to the prism sheet surface.

As shown in FIG. 24B, a plurality of light-shielding members 30 are provided along the grooves 29. Thus, the prism sheet 28 includes the plurality of light-shielding members 30 disposed parallel to one another, the shielding members 30 extending along a direction parallel to the screen surface (just as the grooves 29 and the light-shielding members 26). The light-shielding members 30 can be formed on the side of the sheet 25 from which the light from the irradiation section 21 enters (as shown in FIG. 24A), or the opposite side thereof (i.e., facing the scattering control element 3 and provided with the grooves 29). The portions where the light-shielding members 30 are not provided, i.e., convex portions 31 projecting toward the scattering control element 3, define slits 32 for transmitting the light from the irradiation section 21.

As shown in FIG. 24B, the prism sheet 28 having light-shielding slits functions to transmit the light entering perpendicularly (or substantially perpendicularly) to the prism sheet 28 without being modified, while shielding components of the light which enter the prism sheet 28 substantially obliquely with respect to the light-shielding members 30. As a result, the light transmitted through the prism sheet 28 is converted into uniform light having a directionality along the direction substantially perpendicular with respect to the prism sheet 28. In other words, the prism sheet 28 functions to provide light which is highly collimated along the direction substantially perpendicular to the surface of the prism sheet 28.

Furthermore, when the light from the irradiation section 21 is transmitted through the slits 32 of the prism sheet 28, the light is refracted at the surface of the convex portions 31. As a result, the light is highly gathered onto the scattering control element 3 and the LC display device 2, and the light transmitted through the prism sheet 28 becomes more highly collimated. Thus, even more highly-collimated light is emitted from the illumination device 4 toward the LC display device 2 in the LC display apparatus 300 incorporating the prism sheet 28 having light-shielding slits 32.

Since the prism sheet 28 having light-shielding slits 32 functions to effectively gather light onto the LC display device 2, the frontal luminance of the display can be enhanced.

Thus, the LC display apparatus 300 incorporating the prism sheet 28 having light-shielding slits 32, which allows even more highly-collimated light to be emitted from the illumination device 4 toward the LC display device 2, more effectively provides viewing angle characteristics such that only a viewer situated orthogonally with respect to the display screen can recognize the displayed image when the LC layer 6 is in a transparent state.

As described above, according to the present invention, the viewing angle characteristics can be electrically controlled outside the LC display device, according to the specific situation and the specific purpose of the LC display device. For example, in the case where a number of people simultaneously watch the LC display apparatus, e.g., in a presentation meeting, the LC display apparatus can be placed in the broad viewing angle mode. On the other hand, in the case where the LC display apparatus is used for inputting information in public places or in public transportation means, e.g., airplanes or trains, the LC display apparatus can be placed in the narrow viewing angle mode so that no one but the user can see the display.

Furthermore, by employing an optical element having emission directionality so as to illuminate the LC display device with highly directional light, it becomes impossible to view an image displayed on the LC display device regardless of the viewing angle characteristics inherent in the LC display device itself, thereby realizing a narrow viewing angle mode.

As described above, the LC display apparatus according to one embodiment of the present invention includes a transmissive sheet in an optical path between an irradiation section and an LC display device, with a plurality of light-shielding members being provided on the transmissive sheet so as to be parallel to one another.

As a result, the components of light entering the incident face of the transmissive sheet substantially obliquely are shielded by the light-shielding members, so that light which is highly collimated along the normal axis direction of the transmissive sheet face goes out through the transmissive sheet.

Therefore, an LC display apparatus can be provided which allows highly collimated light to be emitted toward the LC display device.

In the LC display apparatus according to another embodiment of the present invention, a plurality of grooves having roughly V-shaped cross sections are further provided so as to be parallel to one another on a side of the transmissive sheet facing the LC display device, the light-shielding members being provided along such grooves, thereby allowing light from the irradiation section to be efficiently gathered onto the LC display device.

As a result, components of light going out from the irradiation section toward the grooves are shielded by the light-shielding members while components of light entering the portions other than the grooves, i.e., the convex portions projecting toward the LC display device can be refracted at the convex surfaces.

As a result, in addition to the above-mentioned advantage, the LC display apparatus attains efficient gathering of light onto the LC display device and an even higher degree of collimation of light transmitted through the transmission sheet.

In the LC display apparatus according to a further embodiment of the present invention, a scattering control element including a liquid crystal at least capable of controlling scattering of light and a driving means for driving the liquid crystal is provided on a side of the LC display device facing the transmissive sheet or on the opposite side thereof.

As a result, the scattering of light irradiated onto the scattering control element can be controlled, so that the viewing angle characteristics of a displayed image can be controlled. Furthermore, highly collimated light can be emitted toward the LC display device.

Thus, there is provided a further advantage of surely providing viewing angle characteristics such that only a viewer situated orthogonally with respect to the display screen can recognize the displayed image.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus comprising:

a liquid crystal display device;

an illumination device for irradiating the liquid crystal display device with collimated light; and a control device for electrically controlling a direction of travel of light entering the liquid crystal display device, the control device being provided between the liquid crystal display device and the illumination device, thereby having adjustable viewing angle characteristics.

2. A liquid crystal display apparatus according to claim 1, wherein the liquid crystal display device includes a liquid crystal layer sealed between a pair of substrates, the liquid crystal layer including liquid crystal molecules, and the liquid crystal display device having a plurality of pixels, and wherein the liquid crystal molecules in the liquid crystal layer are oriented in two or more directions in a region corresponding to each pixel on at least one of the pair of substrates.

3. A liquid crystal display apparatus according to claim 2, wherein the liquid crystal display device includes a liquid crystal layer sealed between a pair of substrates, the liquid crystal layer including liquid crystal molecules, and the liquid crystal layer having a plurality of liquid crystal regions each substantially surrounded by a polymer wall, and wherein the liquid crystal molecules in each liquid crystal region are oriented in two or more directions on at least one of the pair of substrates.

4. A liquid crystal display apparatus according to claim 2, wherein an alignment layer is provided on at least one of the pair of substrates, the alignment layer causing the liquid crystal molecules in the liquid crystal layer to be oriented in at least two directions.

5. A liquid crystal display apparatus according to claim 4, wherein the alignment layer is a crystalline polymer film having a spherular structure.

6. A liquid crystal display apparatus according to claim 4, wherein the alignment layer is in a non-oriented state, the liquid crystal molecules in the liquid crystal layer being randomly oriented.

7. A liquid crystal display apparatus according to claim 2, wherein the liquid crystal molecules have an axially symmetrical orientation state.

8. A liquid crystal display apparatus comprising:

a liquid crystal display device;

an illumination device having a directionality substantially perpendicular with respect to a display screen of the liquid crystal display device; and a control device for electrically controlling a direction of travel of light, the control device being provided between the liquid crystal display device and the illumination device.

9. A liquid crystal display apparatus according to claim 8, wherein the liquid crystal display device includes a liquid crystal layer sealed between a pair of substrates, the liquid crystal layer including liquid crystal molecules, and the liquid crystal display device having a plurality of pixels, and wherein the liquid crystal molecules in the liquid crystal layer are oriented in two or more directions in a region corresponding to each pixel on at least one of the pair of substrates.

10. A liquid crystal display apparatus according to claim 9, wherein the liquid crystal display device includes a liquid crystal layer sealed between a pair of substrates, the liquid crystal layer including liquid crystal molecules, and the liquid crystal layer having a plurality of liquid crystal regions each substantially surrounded by a polymer wall, and wherein the liquid crystal molecules in each liquid crystal region are oriented in two or more directions on at least one of the pair of substrates.

11. A liquid crystal display apparatus according to claim 9, wherein an alignment layer is provided on at least one of the pair of substrates, the alignment layer causing the liquid crystal molecules in the liquid crystal layer to be oriented in at least two directions.

12. A liquid crystal display apparatus according to claim 11, wherein the alignment layer is a crystalline polymer film having a spherular structure.

13. A liquid crystal display apparatus according to claim 11, wherein the alignment layer is in a non-oriented state, the liquid crystal molecules in the liquid crystal layer being randomly oriented.

14. A liquid crystal display apparatus according to claim 9, wherein the liquid crystal molecules have an axially symmetrical orientation state.

15. A liquid crystal display apparatus including a liquid crystal display device and an irradiation section for irradiating the liquid crystal display device from behind;

a transmissive sheet disposed in an optical path between the irradiation section and the liquid crystal display device;

a plurality of light-shielding members provided on a side of the transmissive sheet so as to be parallel to one another and have a raised profile.

16. A liquid crystal display apparatus according to claim 15, wherein a scattering control element is provided on a side of the liquid crystal display device facing the transmissive sheet or on the opposite side thereof, the scattering control element including a liquid crystal at least capable of controlling scattering of light and a driving means for driving the liquid crystal.

17. A liquid crystal display apparatus including a liquid crystal display device and an irradiation section for irradiating the liquid crystal display device from behind; and a transmissive sheet disposed in an optical path between the irradiation sectin and the liquid crystal display device, wherein a plurality of grooves having roughly V-shaped cross sections are provided so as be parallel to one another on a side of the transmissive sheet facing the liquid crystal display device, and a plurality of light shielding members are provided on a side of the transmissive sheet opposite the side facing the liquid crystal display device, the light-shielding members extending along the plurality of grooves and in parallel to one another, thereby causing light from the irradiation section to be gathered onto the liquid crystal display device.

18. A liquid crystal display apparatus according to claim 17, wherein a scattering control element is provided on a side of the liquid crystal display device facing the transmissive sheet or on the opposite side thereof, the scattering control element including a liquid crystal at least capable of controlling scattering of light and a driving means for driving the liquid crystal.

* * * * *